(12) United States Patent
McIntosh

(10) Patent No.: US 12,617,532 B2
(45) Date of Patent: May 5, 2026

(54) DUAL PURPOSE LAVATORY BARRIER

(71) Applicant: The Boeing Company, Arlington, VA (US)

(72) Inventor: Darren Carl McIntosh, Mukilteo, WA (US)

(73) Assignee: THE BOEING COMPANY, Arlington, VA (US)

( * ) Notice: Subject to any disclaimer, the term of this patent is extended or adjusted under 35 U.S.C. 154(b) by 47 days.

(21) Appl. No.: 18/336,251

(22) Filed: Jun. 16, 2023

(65) Prior Publication Data

US 2024/0417075 A1      Dec. 19, 2024

(51) Int. Cl.
| | |
|---|---|
| *B64D 11/02* | (2006.01) |
| *B64C 1/14* | (2006.01) |

(52) U.S. Cl.
CPC ............ *B64D 11/02* (2013.01); *B64C 1/1469* (2013.01)

(58) Field of Classification Search
CPC ................ B64D 11/02; B64D 45/0028; B64D 45/0026; B64C 1/1469; B64C 1/1484; B64C 1/1476
See application file for complete search history.

(56) References Cited

U.S. PATENT DOCUMENTS

| | | | |
|---|---|---|---|
| 5,285,596 A | 2/1994 | Kinsey | |
| 6,783,098 B1 | 8/2004 | Chavez | |
| 6,817,577 B2 * | 11/2004 | Semprini | .............. B64C 1/1469 |
| | | | 244/129.5 |

| | | | |
|---|---|---|---|
| 9,428,940 B1 | 8/2016 | Patrick | |
| 11,208,744 B2 | 12/2021 | Urbelis | |
| 11,345,476 B2 * | 5/2022 | Dowty | ................. B64C 1/1484 |
| 2006/0000946 A1 | 1/2006 | Garofani et al. | |
| 2009/0065641 A1 | 3/2009 | Koehn et al. | |
| 2016/0083092 A1 | 3/2016 | Long et al. | |
| 2016/0332718 A1 | 11/2016 | Guering | |
| 2017/0341750 A1 | 11/2017 | Gonnsen | |
| 2018/0265216 A1 | 9/2018 | Breigenzer | |
| 2018/0346091 A1 | 12/2018 | Movsesian et al. | |

(Continued)

FOREIGN PATENT DOCUMENTS

| | | |
|---|---|---|
| CN | 110546339 A | 12/2019 |
| CN | 212614220 U | 2/2021 |

(Continued)

OTHER PUBLICATIONS

Federal Aviation Administration, "AC 120-110—Aircraft Secondary Barriers and Alternate Flight Deck Security Procedures", U.S. Department of Transportation, Apr. 14, 2015, pp. 1-5.

(Continued)

*Primary Examiner* — Timothy D Collins
*Assistant Examiner* — Terri L Filosi
(74) *Attorney, Agent, or Firm* — COATS & BENNETT, PLLC

(57) ABSTRACT

A dual purpose aircraft lavatory component that can be a dual purpose aircraft lavatory door that is configured to deploy in a vehicle cabin from an initial position as an aircraft lavatory monument component into a deployed position converting aircraft lavatory monument component into an aircraft cabin lockable barrier to prevent passengers from moving along an aisle in a vehicle cabin into a vehicle area forward of the lockable barrier.

20 Claims, 22 Drawing Sheets

(56) References Cited

U.S. PATENT DOCUMENTS

| 2020/0108907 A1 | 4/2020 | Movsesian et al. |
| 2020/0115029 A1 | 4/2020 | Movsesian et al. |
| 2022/0177110 A1 | 6/2022 | Mathieu et al. |

FOREIGN PATENT DOCUMENTS

| EP | 2796370 A1 | 10/2014 |
| EP | 2851296 A1 | 3/2015 |
| EP | 3552963 A1 | 10/2019 |
| EP | 3741676 A1 | 11/2020 |
| GB | 2307712 A | 6/1997 |

OTHER PUBLICATIONS

Hexarmor, "SuperFabric cut protection, HexArmor with cut-resistant SuperFabric inside", Jan. 1, 2023, pp. 1-2.
Aitex, "Anti-Vandal Upholstery Resistant to Cuts by Stabs and Arson", retrieved from the internet: URL: https://www.aitex.es/tapicerias-antivandalicas/ [retrieved on May 2, 2023]; pp. 1-5.
Cut-Tex Pro, "The Ultimate Cut Protection—Technical Data Sheet", Jan. 1, 2023, pp. 1-3.
Peppermill Home, "Spectrum Via 36×80 Vinyl Folding Door", Jan. 1, 2023, pp. 1-5.
Wheatbelt, Inc., "Two New Rolling Shutter Slats from Wheatbelt, Inc." Jan. 1, 2023, pp. 1-5.
Wheatbelt, Inc., "Rolling Shutter Manufacturing in Hillsboro, KS", retrieved from the internet: URL: https://www.rollupshutter.com [retrieved on Jun. 15, 2023], pp. 1.
Roll-A-Shield, "RAS-section-view-of-slats", retrieved from the internet: URL: https://rollashield.com/shutters/ras-section-view-of-slats/ [retrieved on Jun. 15, 2023], pp. 1-2.
Cut-Tex Pro, "Cut Resistant Fabric for Clothing & Workwear (Cut Level 5)", retrieved from the internet: URL: https://cut-tex.com/ [retrieved on Jun. 15, 2023], pp. 1-25.
Aitex, "Vandal Proof Upholstery Which Can Withstand Slashing and Burning", retrieved from the internet: URL: https://www.aitex.es/tapicerias-antivandalicas/?lang=en [retrieved on Jun. 15, 2023], pp. 1-5.
Hexarmor, "Global Leader in Personal Protective Equipment", retrieved from the internet: URL: https://www.hexarmor.com/ [retrieved on Jun. 15, 2023], pp. 1-5.
Kozane, "High-performance and cut-resistant fabrics for outstanding protection and wearability", retrieved from the internet: URL: https://www.kozaneprotection.com/ [retrieved on Jun. 15, 2023], pp. 1-6.
EP Search Report mailed Aug. 24, 2024 in re EP Application No. 24165860.8.
EP Search Report mailed Sep. 25, 2024 in re EP Application No. 24168757.3.
EP Search Report mailed Jul. 24, 2024 in re EP Application No. 24167937.2.

* cited by examiner

FIG. 13

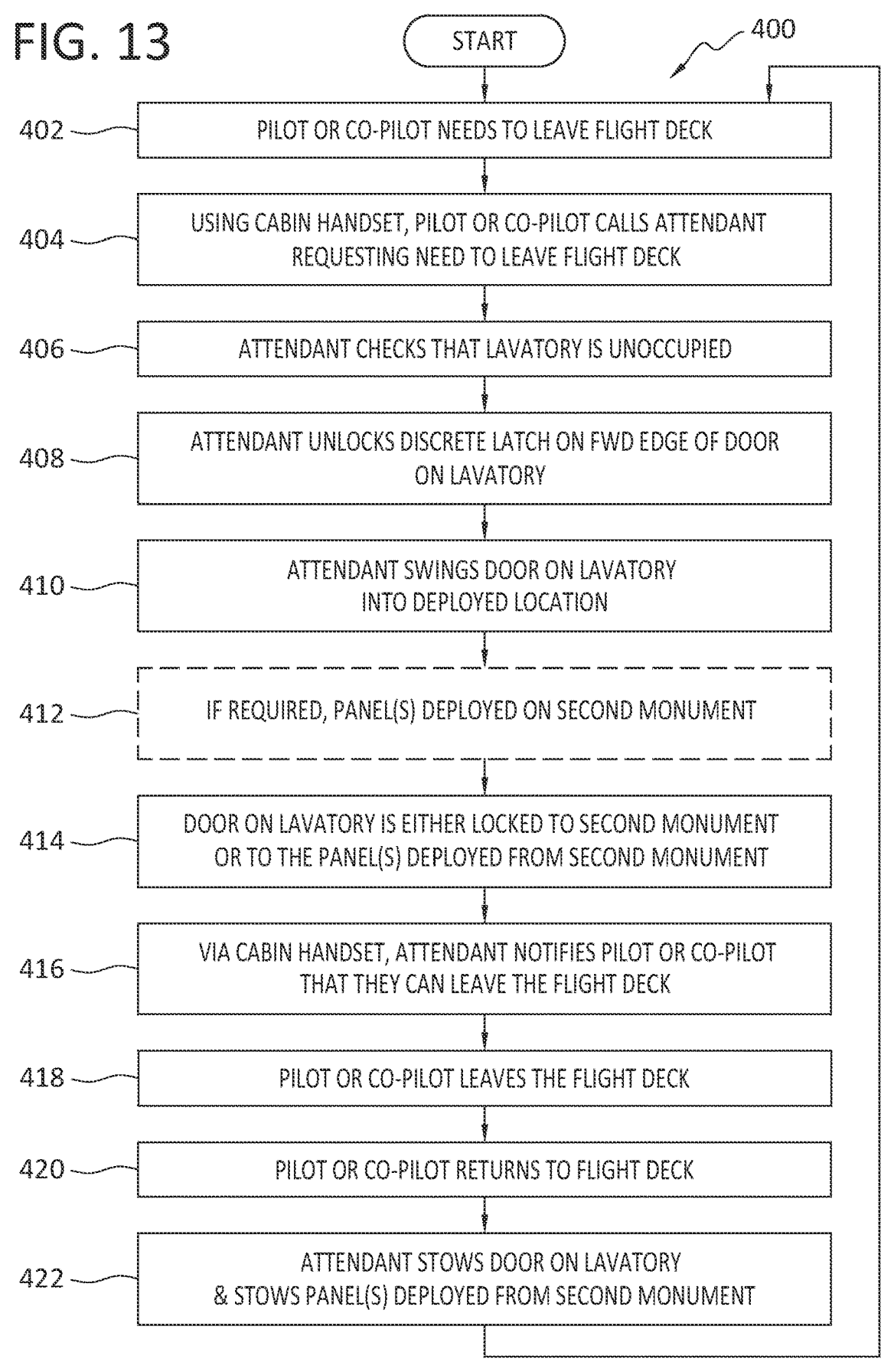

START     400

402 — PILOT OR CO-PILOT NEEDS TO LEAVE FLIGHT DECK

404 — USING CABIN HANDSET, PILOT OR CO-PILOT CALLS ATTENDANT REQUESTING NEED TO LEAVE FLIGHT DECK

406 — ATTENDANT CHECKS THAT LAVATORY IS UNOCCUPIED

408 — ATTENDANT UNLOCKS DISCRETE LATCH ON FWD EDGE OF DOOR ON LAVATORY

410 — ATTENDANT SWINGS DOOR ON LAVATORY INTO DEPLOYED LOCATION

412 — IF REQUIRED, PANEL(S) DEPLOYED ON SECOND MONUMENT

414 — DOOR ON LAVATORY IS EITHER LOCKED TO SECOND MONUMENT OR TO THE PANEL(S) DEPLOYED FROM SECOND MONUMENT

416 — VIA CABIN HANDSET, ATTENDANT NOTIFIES PILOT OR CO-PILOT THAT THEY CAN LEAVE THE FLIGHT DECK

418 — PILOT OR CO-PILOT LEAVES THE FLIGHT DECK

420 — PILOT OR CO-PILOT RETURNS TO FLIGHT DECK

422 — ATTENDANT STOWS DOOR ON LAVATORY & STOWS PANEL(S) DEPLOYED FROM SECOND MONUMENT

DUAL PURPOSE LAVATORY BARRIER

TECHNOLOGICAL FIELD

The present disclosure relates generally to the field of barriers and, more specifically, to barrier doors configured to be used within an aircraft.

BACKGROUND

Aircraft have a flight deck that includes flight instruments, instrument panels, and various controls that enable the flight personnel to operate the aircraft. The flight deck is positioned towards the front of the aircraft and is usually a separate compartment away from the cabin area where passengers sit during flight. A flight deck door further separates the flight deck from the cabin area.

The flight deck door is closed and locked during flight. This allows the flight personnel to concentrate on operating the aircraft and also prevents entry of unwanted persons into the flight deck. However, the flight deck door may be opened during flight for various reasons. One occurrence is when the flight personnel use the lavatory which is located in the cabin area of the aircraft. Another occurrence is when food and/or drinks that are prepared in the galley of the cabin area are delivered to the flight personnel on the flight deck.

Opening of the flight deck door could present an opportunity for an unwanted person to gain entry to the flight deck. The unwanted person could suddenly rush the front of the aircraft once the flight deck door is opened and force their way into the flight deck. It would be difficult for flight personnel working in the cabin area to react to this movement in a fast enough manner to close and lock the flight deck door.

A device is needed that would inhibit a person from rushing towards the flight deck. The device would prevent the person from reaching the front of the aircraft or would slow their movement such that the flight deck door could be closed and locked prior to the person reaching the flight deck.

Unless explicitly identified as such, no statement herein is admitted as prior art merely by its inclusion in the Technological Field and/or Background section.

SUMMARY

Present aspects are directed to a deployable barrier in a vehicle cabin area that can be, for example, an aircraft cabin vestibule area, with the barrier formed by deploying a dual purpose lavatory component from a lavatory component configuration into a deployed lavatory component barrier configuration/position, with the barrier in the deployed lavatory component barrier position configured to impede passage of a person from a cabin area, including from a cabin area and vestibule area into a vehicle control deck area positioned forward of the deployed lavatory component barrier, with the vehicle control deck area being, for example, a flight deck in an aircraft.

A present aspect is directed to an aircraft cabin barrier including an aircraft cabin lavatory monument, with the aircraft cabin lavatory monument including an aircraft cabin lavatory component, with the aircraft lavatory component including at least one of a movable aircraft lavatory door and an aircraft lavatory wall. The aircraft cabin barrier further includes an aircraft cabin second monument, with the aircraft cabin second monument positioned a selected distance from and across an aircraft cabin aisle from the aircraft cabin lavatory monument, with the aircraft cabin second monument including a second monument component, with the aircraft cabin second monument component including at least one of an aircraft cabin second monument wall and a movable aircraft cabin second monument panel, with the second monument component configured to engage the aircraft cabin lavatory component, and wherein the aircraft cabin lavatory component in an engaged state with the aircraft cabin second monument component forms an aircraft cabin barrier.

In another aspect, the aircraft cabin barrier is configured to prevent movement of a person, including an unwanted person from the passenger cabin into a flight deck.

In another aspect, the aircraft cabin lavatory component is a movable aircraft cabin lavatory door movably attached to an aircraft cabin lavatory monument, with the movable aircraft cabin lavatory door movable between a lavatory door first engaged position in contact with the aircraft cabin lavatory monument and a lavatory door second engaged position in contact with a second aircraft cabin monument component.

In another aspect, the aircraft cabin lavatory component is a movable aircraft cabin lavatory door and the aircraft cabin second monument component is an aircraft cabin galley wall.

In another aspect, the aircraft cabin lavatory component is a movable aircraft cabin lavatory door and the aircraft cabin second monument component is a movable aircraft cabin galley panel.

In a further aspect, the aircraft cabin lavatory component is an aircraft cabin lavatory wall and the aircraft cabin second monument component is a movable aircraft cabin galley panel.

In another aspect, the second monument component engages the aircraft cabin lavatory component in a locked configuration via a locking mechanism.

In another aspect, the movable aircraft lavatory door further includes a movable aircraft lavatory door first side, a movable aircraft cabin lavatory door second side, a through opening region extending through a door thickness of the movable aircraft lavatory door, with the door thickness extending from the movable aircraft lavatory door first side to the movable aircraft lavatory door second side and a movable opaque window panel movably attached at the movable aircraft lavatory door first side, with the movable opaque window panel configured to selectively permit visual access through the movable aircraft lavatory door.

In another aspect, the movable aircraft lavatory comprises a plurality of folding door panels.

In a further aspect, the aircraft cabin barrier further includes a barrier locking mechanism that is exclusively accessible from the movable aircraft lavatory door first side.

In another aspect, the movable aircraft cabin second monument panel further includes a movable aircraft cabin second monument panel first side, a movable aircraft cabin second monument panel second side, a through opening region extending through a panel thickness of the movable aircraft cabin second monument panel, with the panel thickness extending from the movable aircraft cabin second monument panel first side to the movable aircraft cabin second monument panel second side and a movable opaque window panel movably attached at the movable aircraft cabin second monument first side, said movable opaque window panel configured to selectively permit visual access through the movable aircraft cabin second monument panel.

In another aspect, the aircraft cabin second monument panel comprises a plurality of movable aircraft cabin second monument panels.

In another aspect, the aircraft cabin barrier further includes a barrier locking mechanism that is exclusively accessible from the movable aircraft cabin second monument panel first side.

Another aspect is directed to an aircraft including an aircraft cabin barrier including an aircraft cabin lavatory monument, with the aircraft cabin lavatory monument including an aircraft cabin lavatory component, with the aircraft lavatory component including at least one of a movable aircraft lavatory door and an aircraft lavatory wall. The aircraft cabin barrier further includes an aircraft cabin second monument, with the aircraft cabin second monument positioned a selected distance from and across an aircraft cabin aisle from the aircraft cabin lavatory monument, with the aircraft cabin second monument including a second monument component, with the aircraft cabin second monument component including at least one of an aircraft cabin second monument wall and a movable aircraft cabin second monument panel, with the second monument component configured to engage the aircraft cabin lavatory component, and wherein the aircraft cabin lavatory component in an engaged state with the aircraft cabin second monument component forms an aircraft cabin barrier. When the aircraft cabin lavatory component is a movable aircraft cabin lavatory door the movable aircraft lavatory door further includes a movable aircraft lavatory door first side, a movable aircraft cabin lavatory door second side, a through opening region extending through a door thickness of the movable aircraft lavatory door, with the door thickness extending from the movable aircraft lavatory door first side to the movable aircraft lavatory door second side and a movable opaque window panel movably attached at the movable aircraft lavatory door first side, with the movable opaque window panel configured to selectively permit visual access through the movable aircraft lavatory door.

A further aspect is directed to an aircraft including an aircraft cabin barrier including an aircraft cabin lavatory monument, with the aircraft cabin lavatory monument including an aircraft cabin lavatory component, with the aircraft lavatory component including at least one of a movable aircraft lavatory door and an aircraft lavatory wall. The aircraft cabin barrier further includes an aircraft cabin second monument, with the aircraft cabin second monument positioned a selected distance from and across an aircraft cabin aisle from the aircraft cabin lavatory monument, with the aircraft cabin second monument including a second monument component, with the aircraft cabin second monument component including at least one of an aircraft cabin second monument wall and a movable aircraft cabin second monument panel, with the second monument component configured to engage the aircraft cabin lavatory component, and wherein the aircraft cabin lavatory component in an engaged state with the aircraft cabin second monument component forms an aircraft cabin barrier. The aircraft cabin second monument panel further includes a movable aircraft cabin second monument panel first side, a movable aircraft cabin second monument panel second side, a through opening region extending through a panel thickness of the movable aircraft cabin second monument panel, with the panel thickness extending from the movable aircraft cabin second monument panel first side to the movable aircraft cabin second monument panel second side and a movable opaque window panel movably attached at the movable aircraft cabin second monument first side, with the movable opaque window panel configured to selectively permit visual access through the movable aircraft cabin second monument panel.

A further aspect is directed to an aircraft cabin lavatory monument, with the monument including a dual purpose aircraft cabin lavatory door movably attached to an aircraft cabin lavatory frame, with the dual purpose aircraft cabin lavatory door including a movable aircraft lavatory door first side, a movable aircraft cabin lavatory door second side, and a through opening region extending through a door thickness of the dual purpose aircraft lavatory door, with the door thickness extending from the dual purpose aircraft lavatory door first side to the movable aircraft lavatory door second side. The dual purpose aircraft cabin lavatory door further includes a movable opaque window panel movably attached at the dual purpose aircraft lavatory door first side, with the movable opaque window panel configured to selectively permit visual access through the dual purpose aircraft lavatory door, and wherein in a closed position in a first lavatory door mode, the dual purpose aircraft lavatory door is configured to completely enclose an aircraft cabin lavatory monument footprint, and wherein in a closed position in a second lavatory door mode, said dual purpose aircraft lavatory door is configured to engage an aircraft cabin second monument to form an aircraft cabin barrier, with the aircraft cabin barrier configured to control movement of passengers along an aisle within an aircraft cabin area.

A further present aspect is directed to a method of controlling movement of passengers along an aisle within an aircraft cabin area, with the method including, prior to opening a flight deck door, moving a barrier to a closed position with a flight deck being on a first side of the barrier and a passenger section of the cabin area being on a second side of the barrier. The barrier further includes an aircraft cabin lavatory monument, said aircraft cabin lavatory monument comprising an aircraft cabin lavatory component that can be a lavatory door or lavatory wall, with the aircraft lavatory component comprising at least one of a movable aircraft lavatory door and an aircraft lavatory wall. The barrier further includes an aircraft cabin second monument, with the aircraft cabin second monument positioned a selected distance from and across an aircraft cabin aisle from the aircraft cabin lavatory monument, with the aircraft cabin second monument including a second monument component, with the aircraft cabin second monument component including at least one of an aircraft cabin second monument wall and a movable aircraft cabin second monument panel, with the second monument component configured to engage the aircraft cabin lavatory component, and wherein the aircraft cabin lavatory component in an engaged state with the aircraft cabin second monument component forms the barrier. The method further includes locking the barrier in the closed position, after locking the barrier, opening the flight deck door and providing access to flight personnel to a front section of the cabin area, with the front section of the cabin area located at the first side of the barrier, and, after providing access to the front section of the cabin area to the flight personnel, reclosing the flight deck door.

In another aspect the method further includes monitoring a position of the barrier, and activating an indicator in the flight deck when the barrier is in the closed position.

In another aspect, in a further method, the aircraft cabin lavatory monument component is a movable aircraft lavatory door that further includes, a movable aircraft lavatory door first side a movable aircraft cabin lavatory door second side, and a movable aircraft cabin lavatory door through opening region extending through a door thickness of the movable aircraft lavatory door, with the door thickness extending from the movable aircraft lavatory door first said to the movable aircraft lavatory door second side, and a movable opaque window panel movably attached at the movable aircraft lavatory door first side, with the movable opaque window panel configured to selectively permit visual access through the movable aircraft lavatory door. The method further includes, after locking the barrier, moving the movable opaque window panel to permit visual access through the movable aircraft lavatory door through opening region.

In another aspect, in a further method, the aircraft cabin second monument is a movable aircraft cabin second monument panel that includes a movable aircraft cabin second monument panel first side, a movable aircraft cabin second monument panel second side, a movable aircraft cabin second monument panel through opening region extending through a panel thickness of the movable aircraft cabin second monument panel, with the panel thickness extending from the movable aircraft cabin second monument panel first side to the movable aircraft cabin second monument panel second side, and a movable opaque window panel movably attached at the movable aircraft cabin second monument first side, with movable opaque window panel configured to selectively permit visual access through the movable aircraft cabin second monument panel through opening region. The method further includes after locking the barrier, moving the movable opaque window panel to permit visual access through the movable aircraft cabin second monument panel through opening region.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1A:
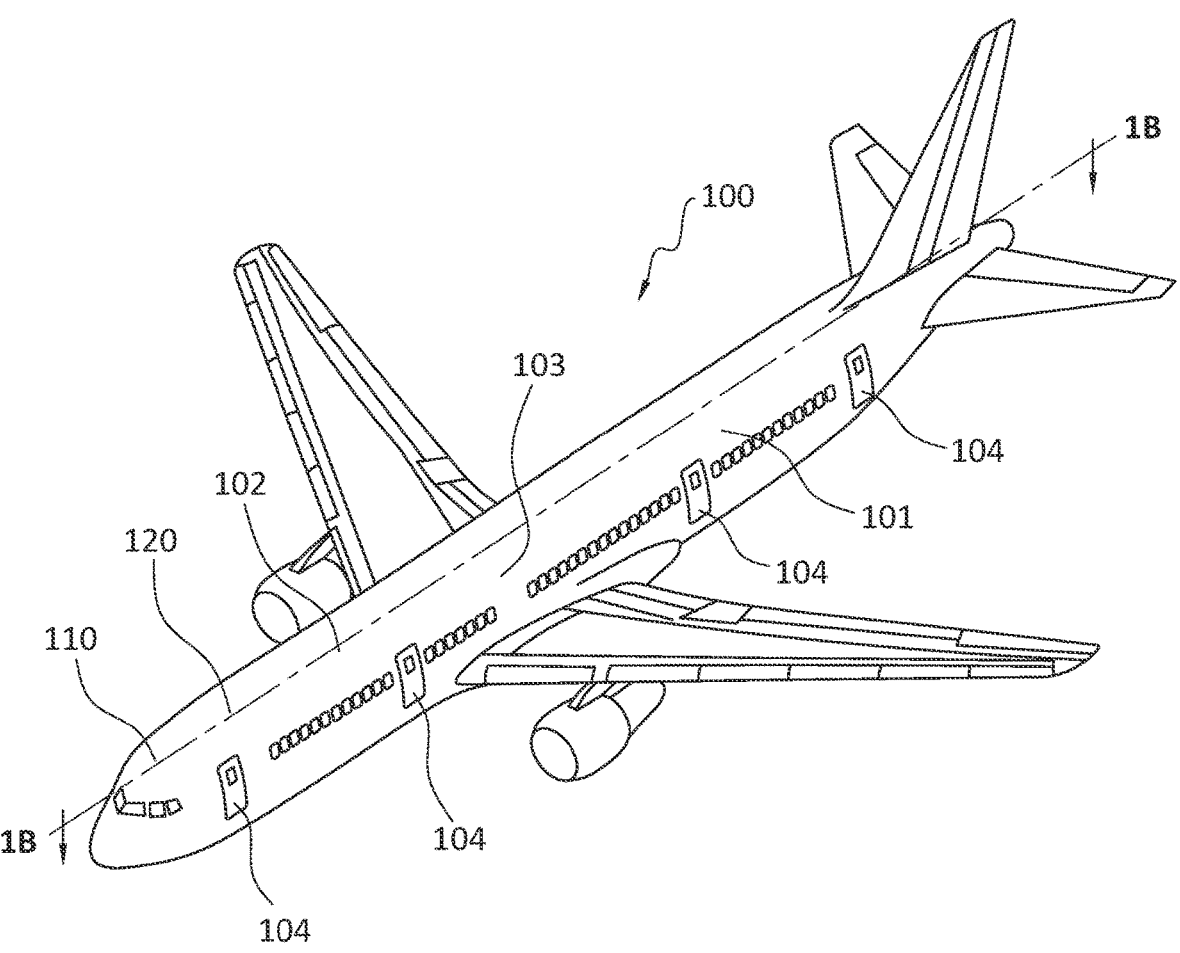
Figure 1B:
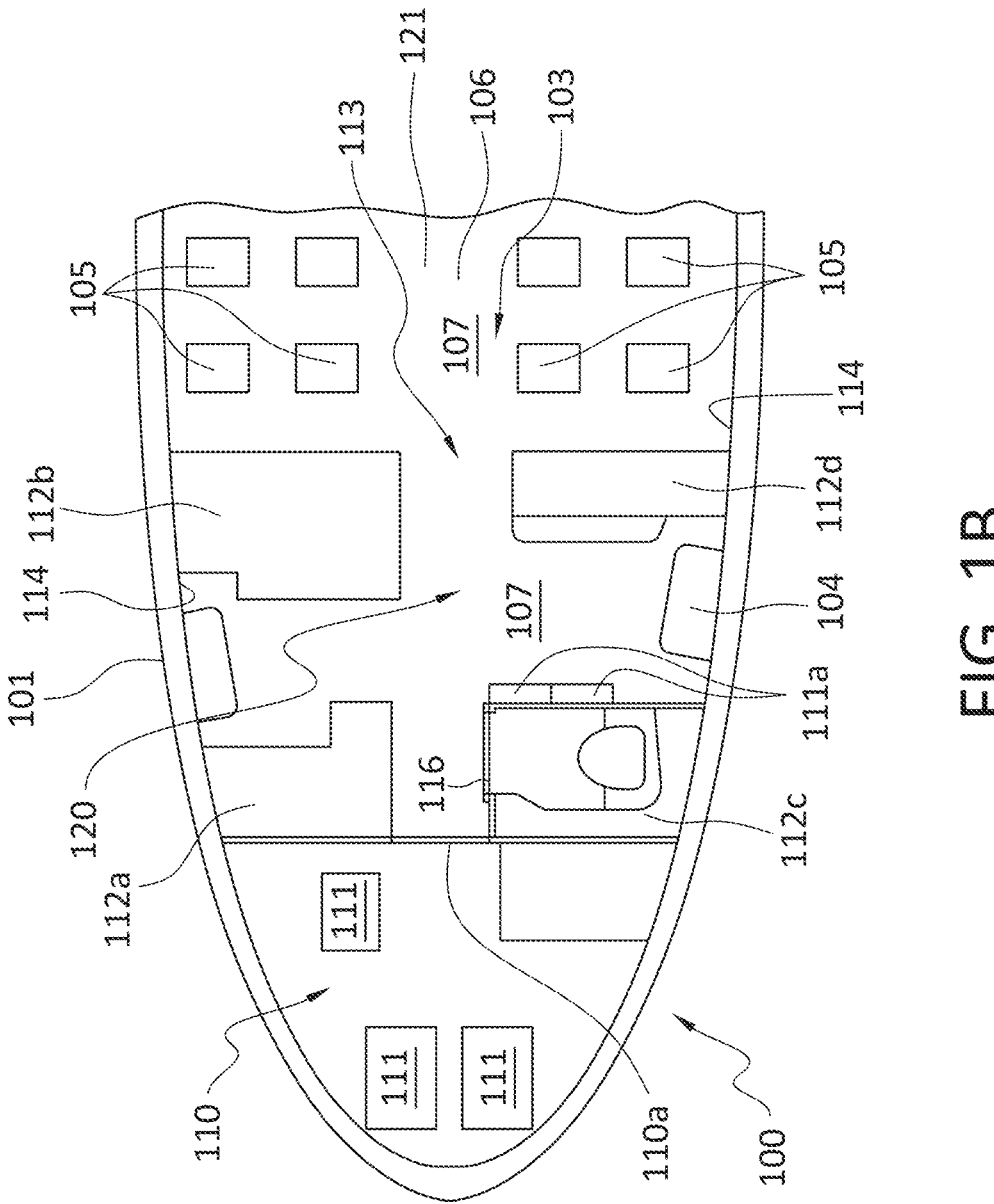
Figures 2A, 2B:
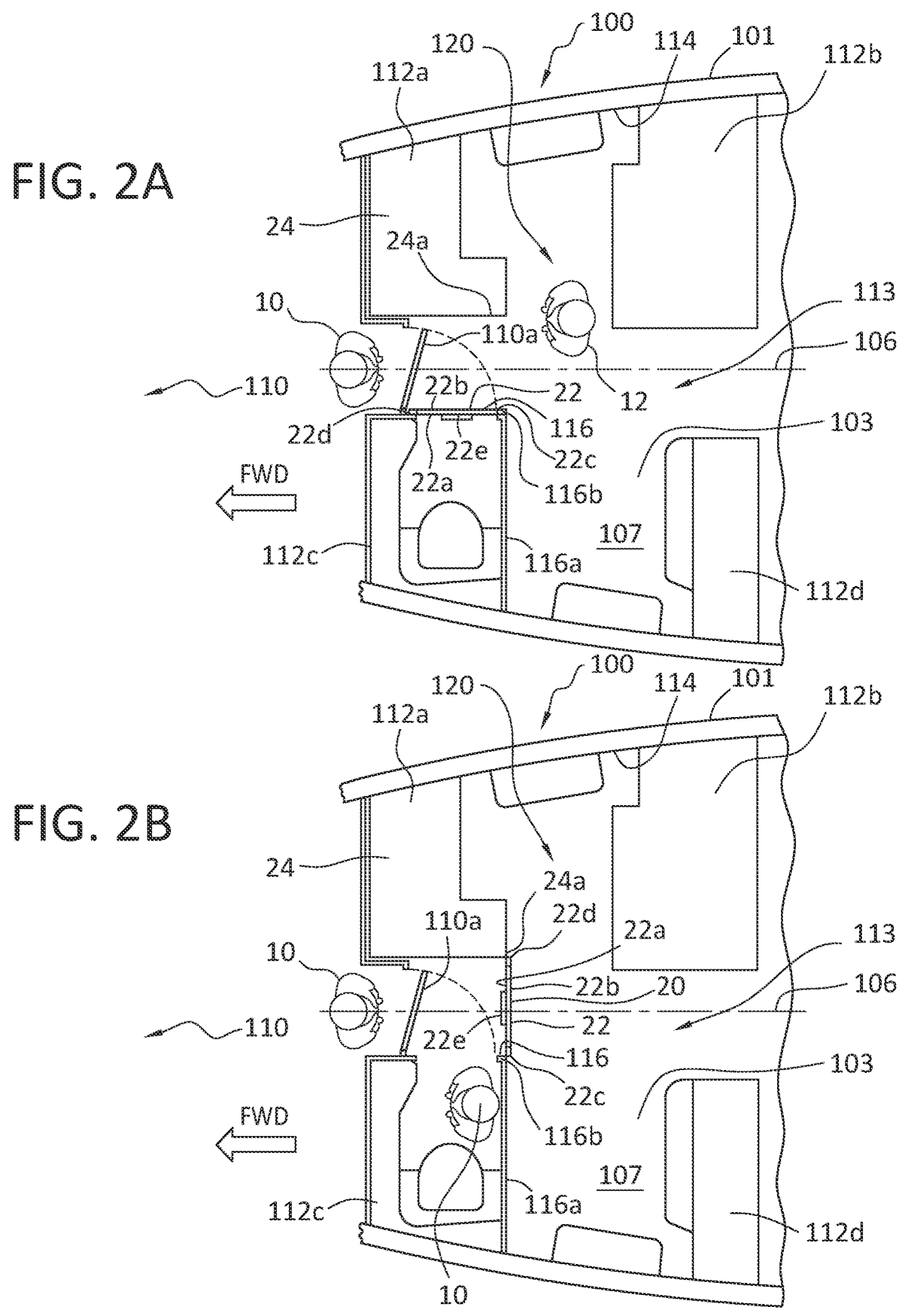
Figure 2C:
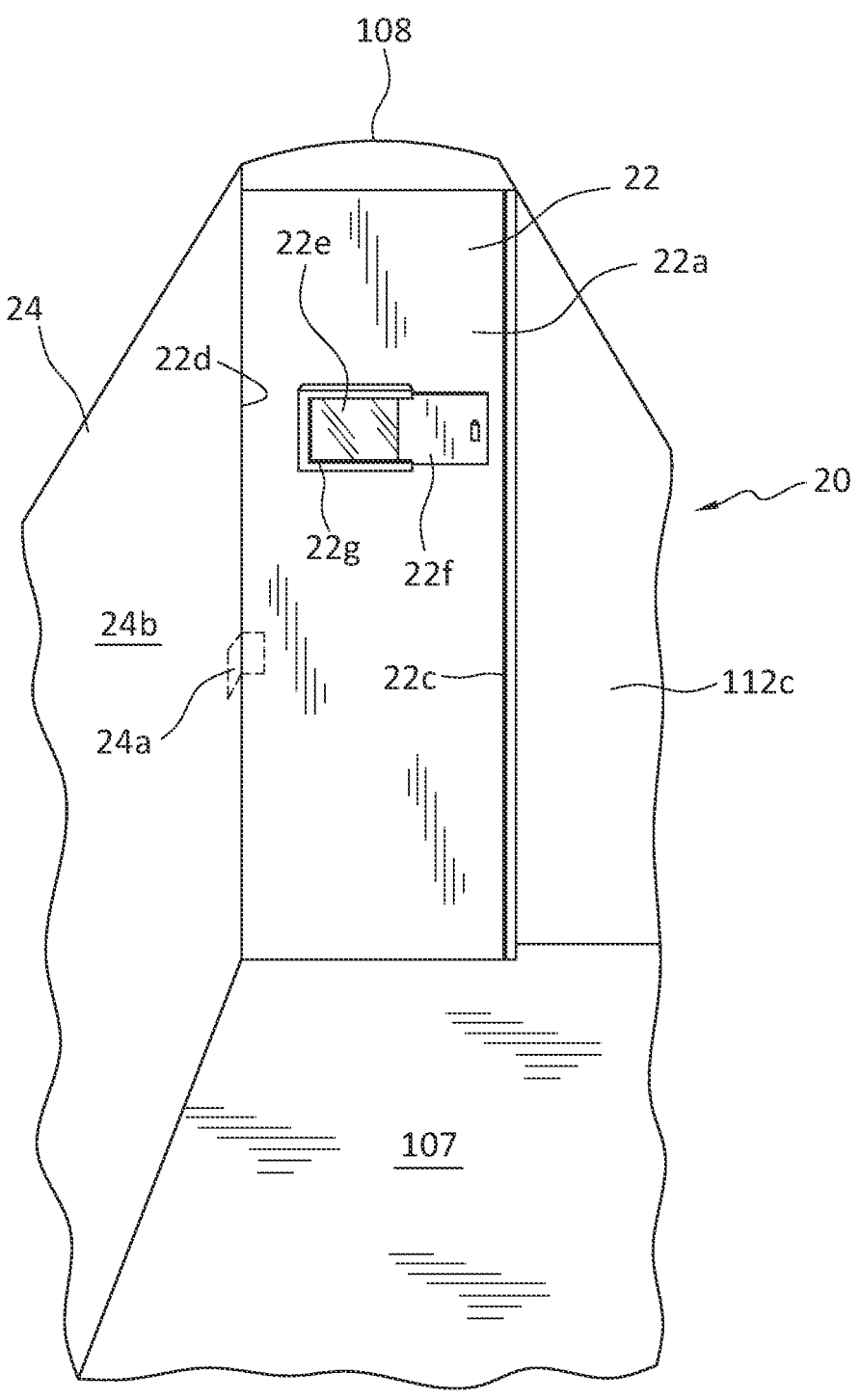
Figures 3A, 3B:
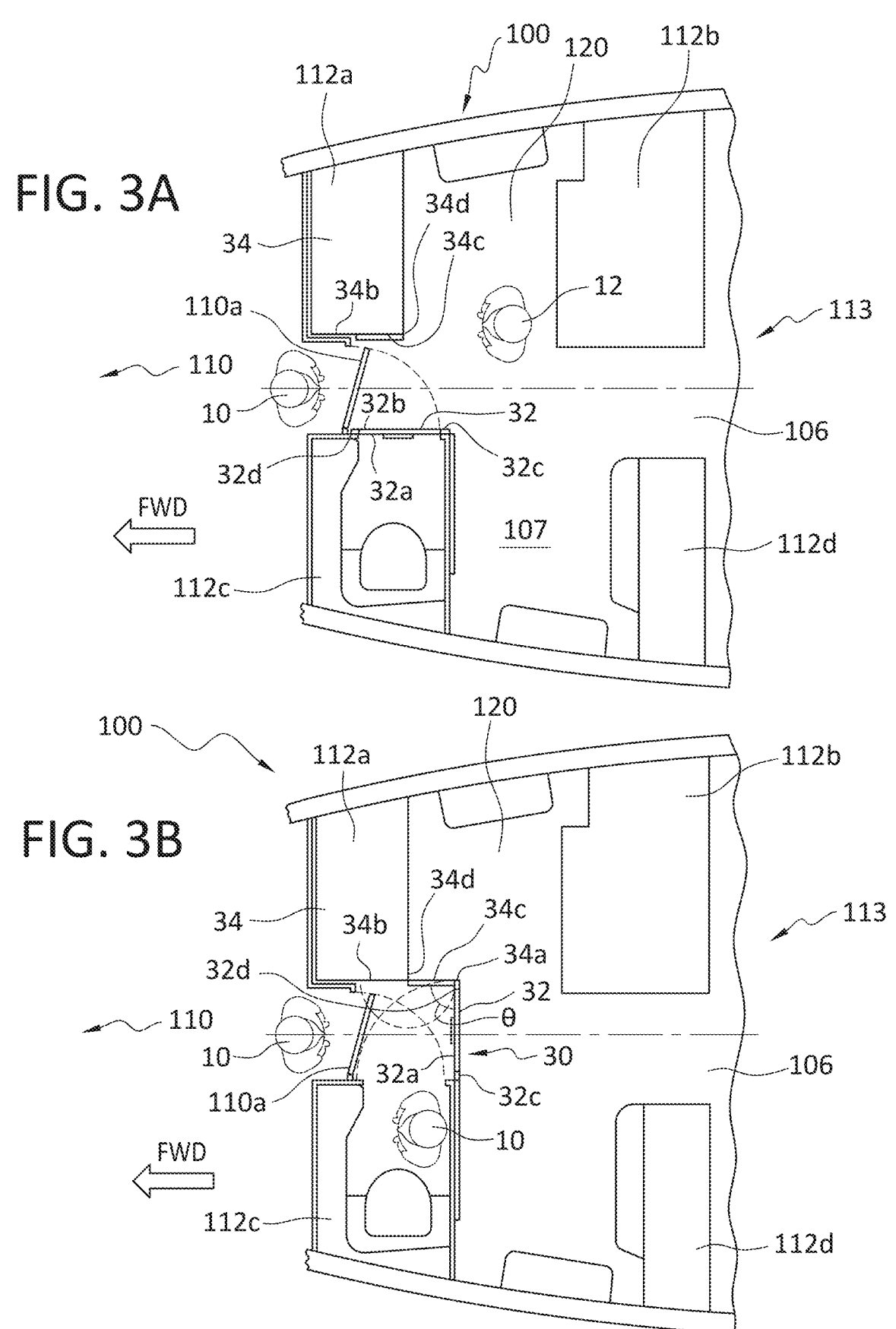
Figure 3C:
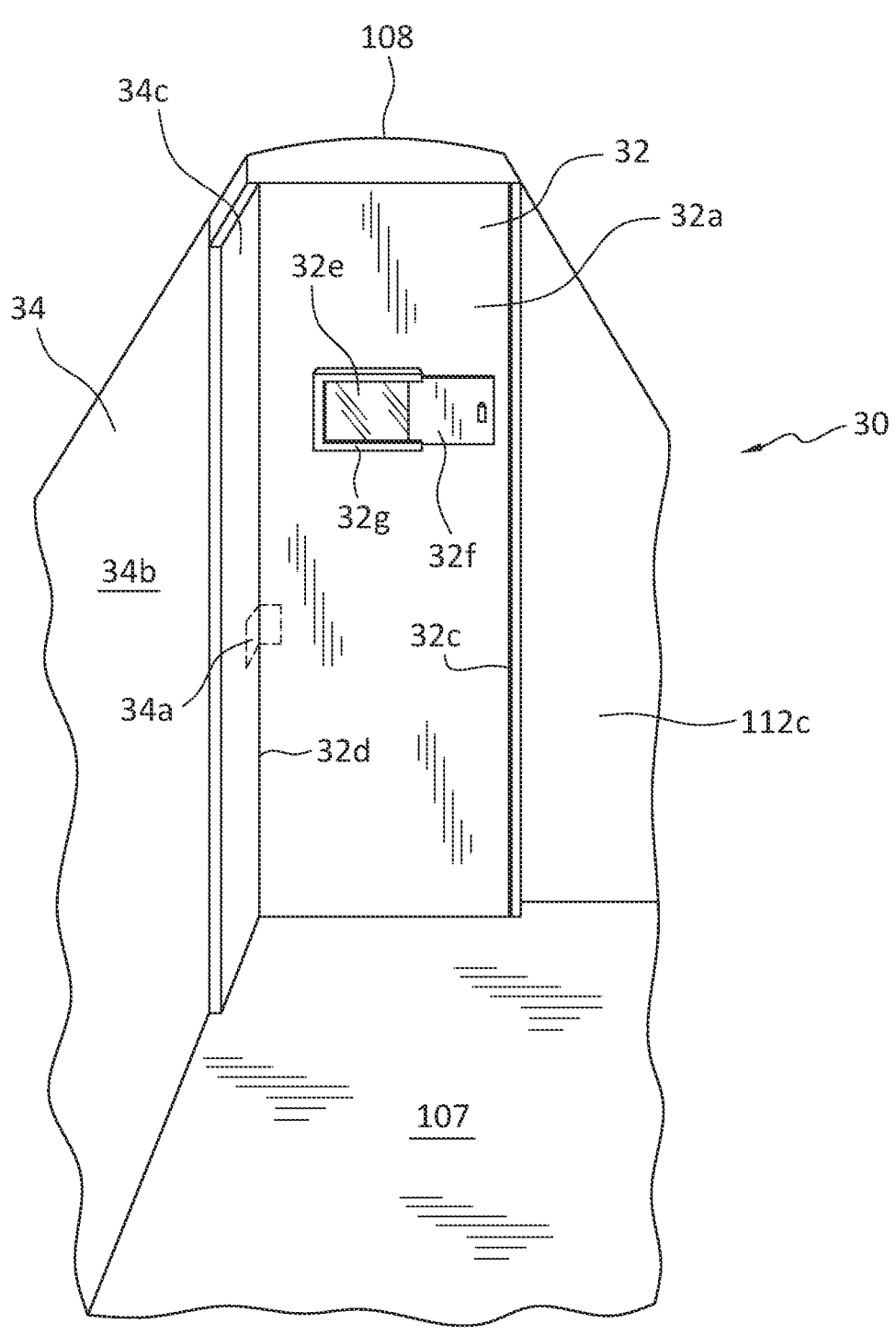
Figures 4A, 4B:
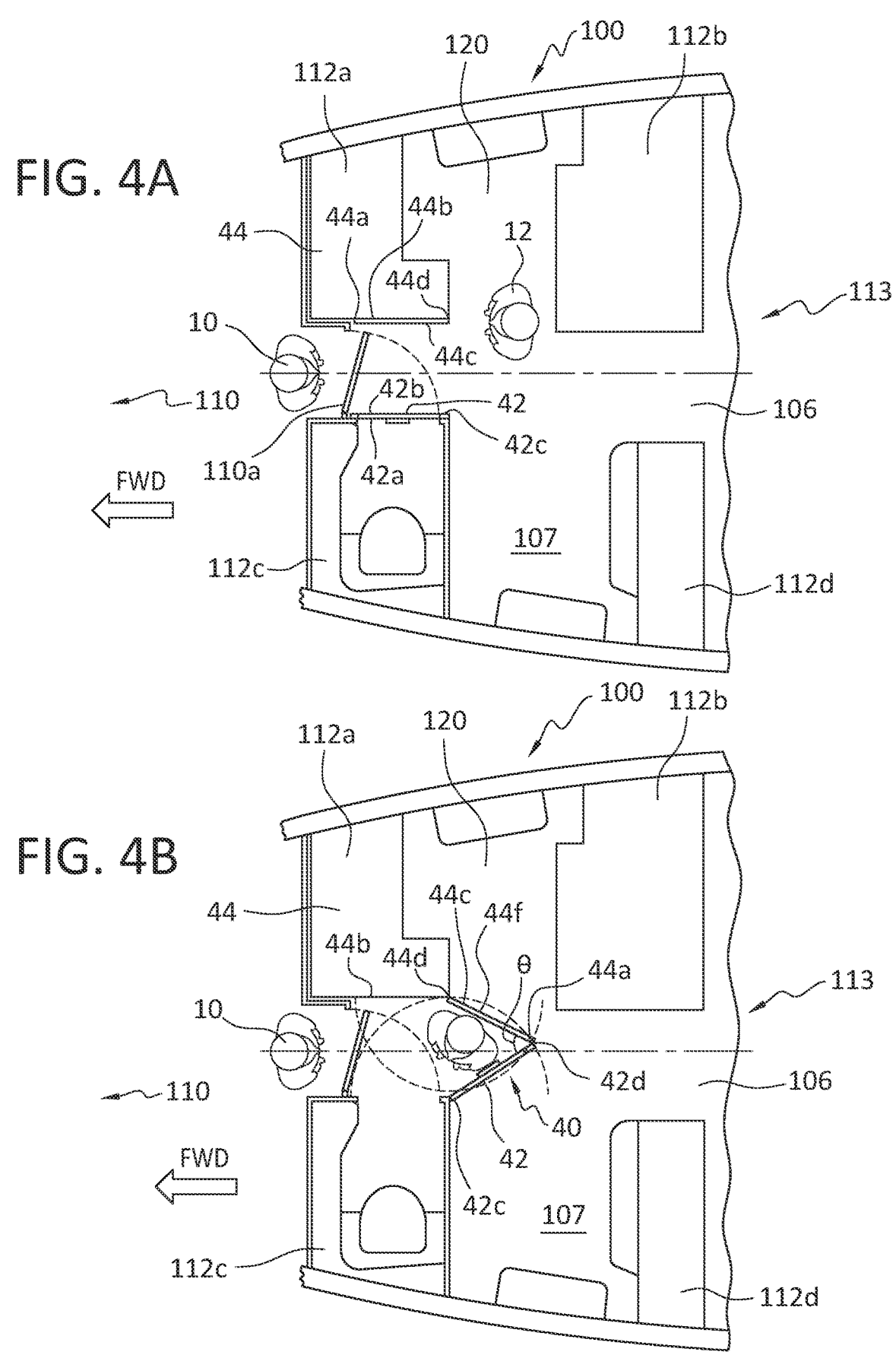
Figure 4C:
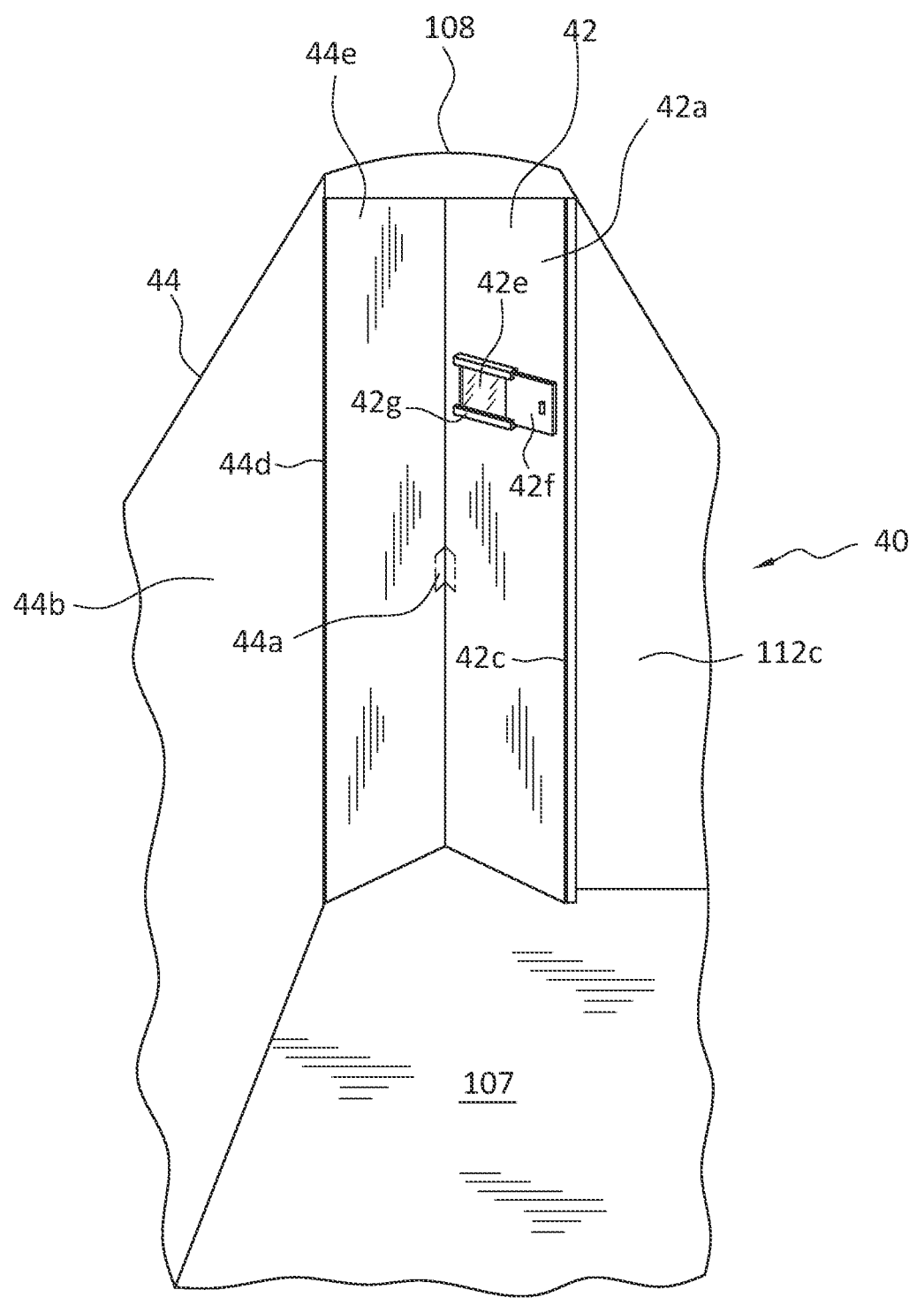
Figures 5A, 5B:
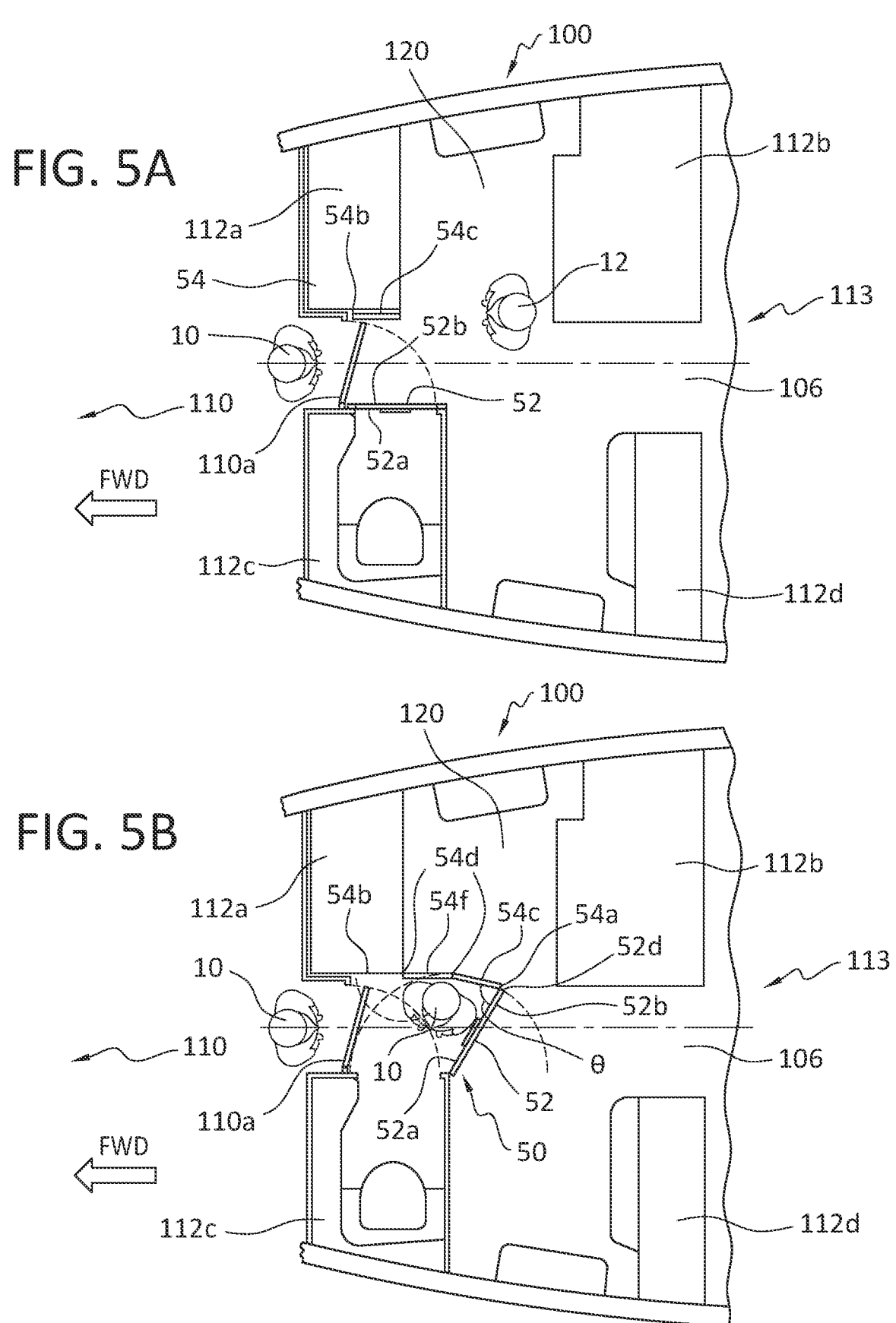
Figure 5C:
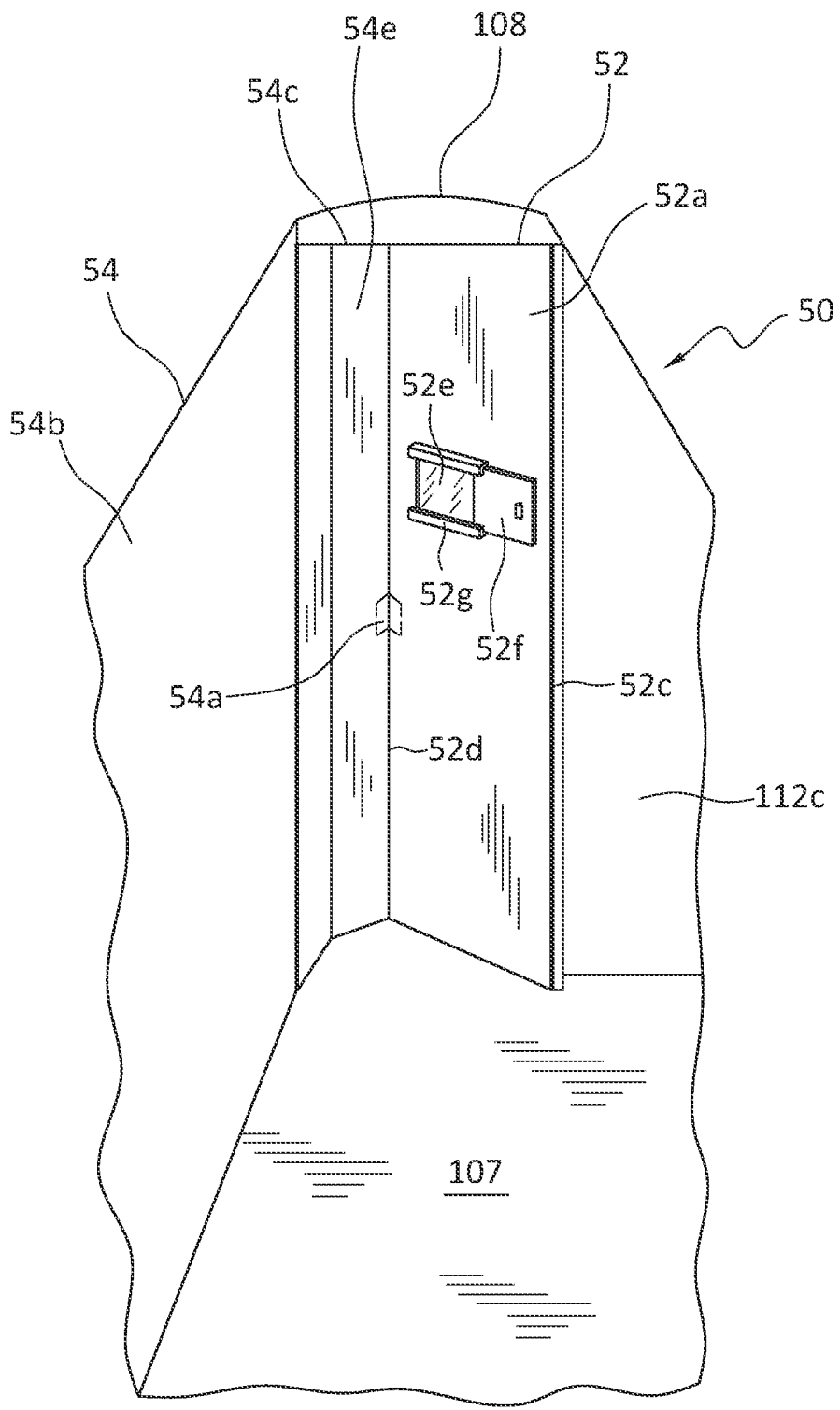
Figures 6A, 6B:
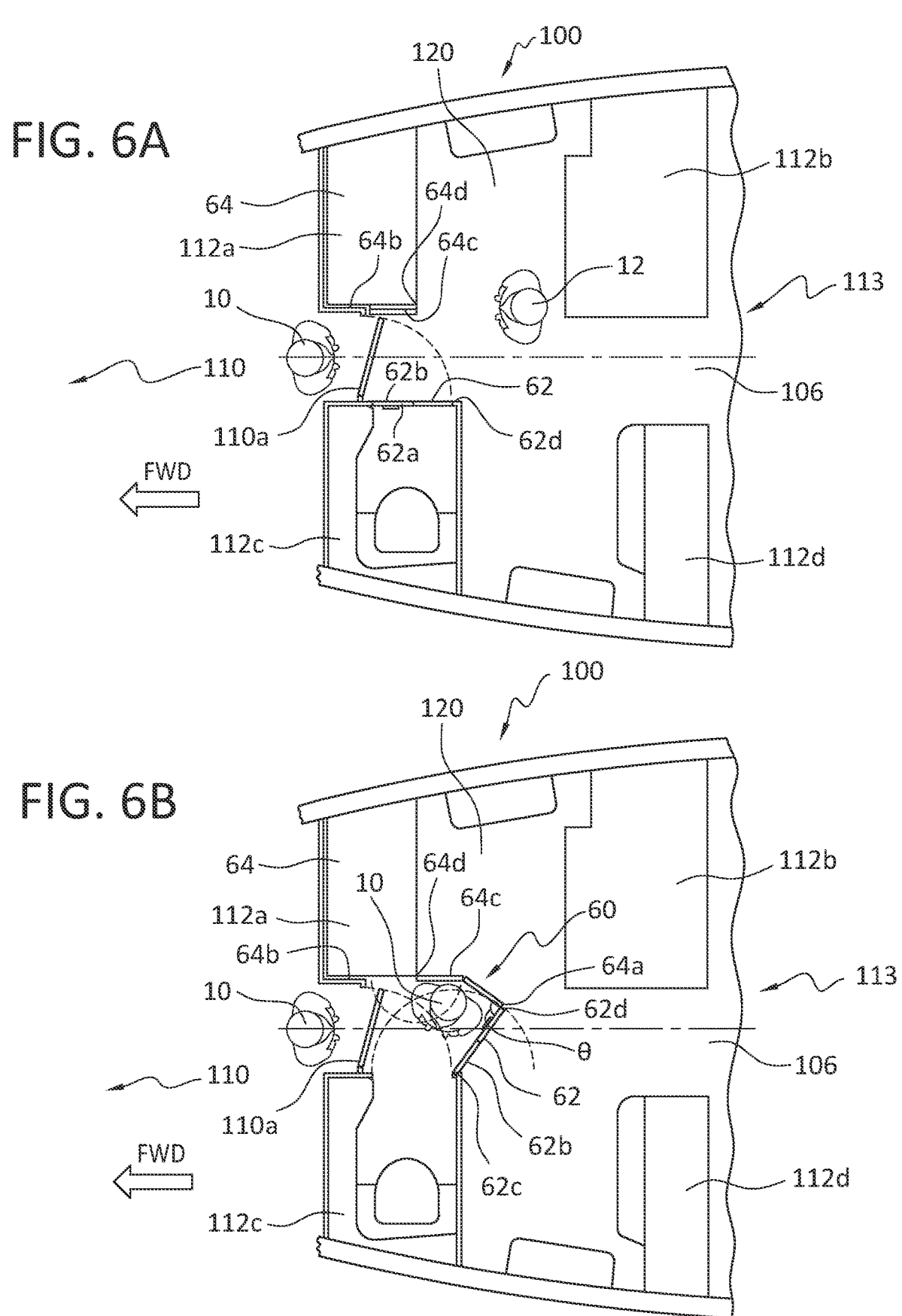
Figure 6C:
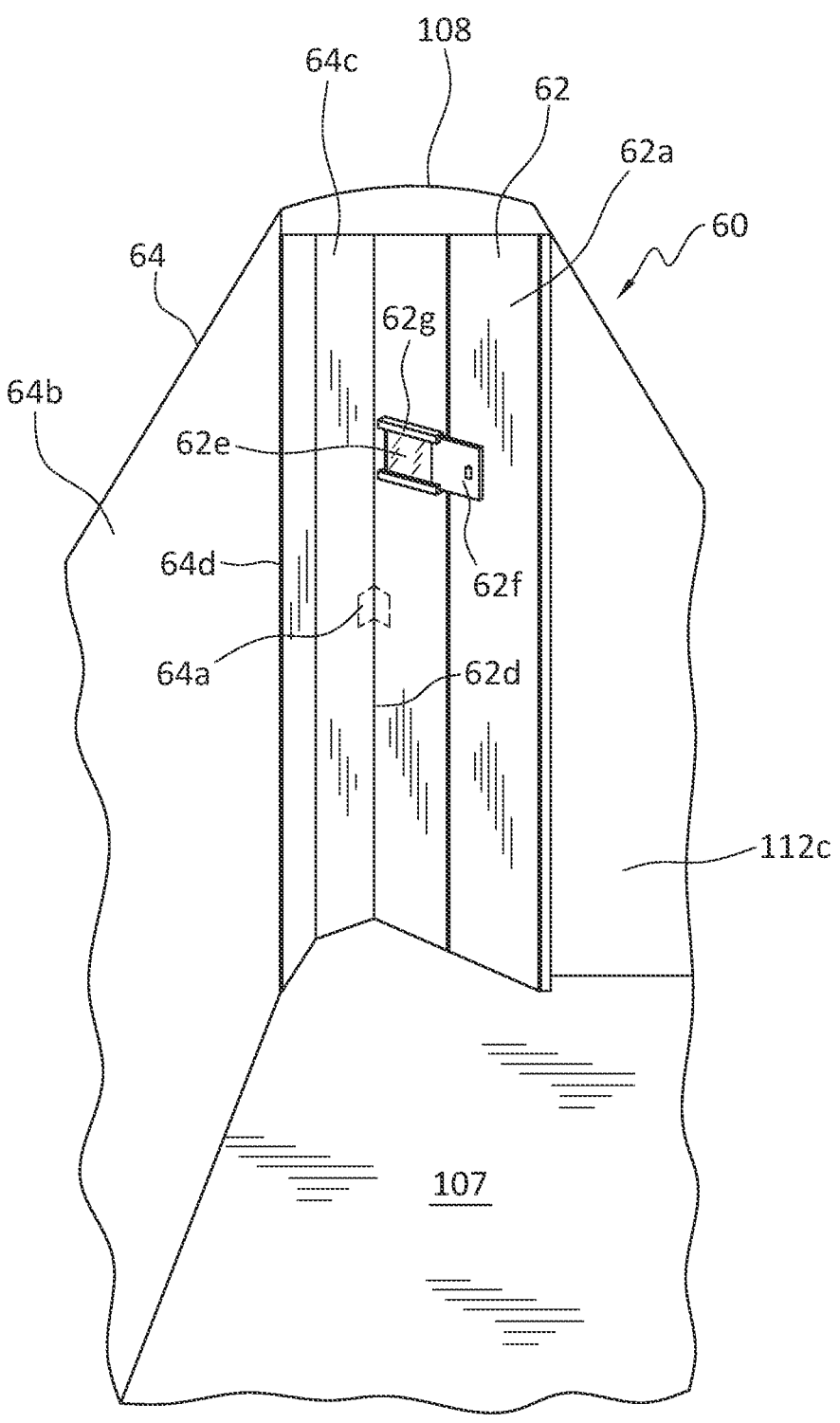
Figures 7A, 7B:
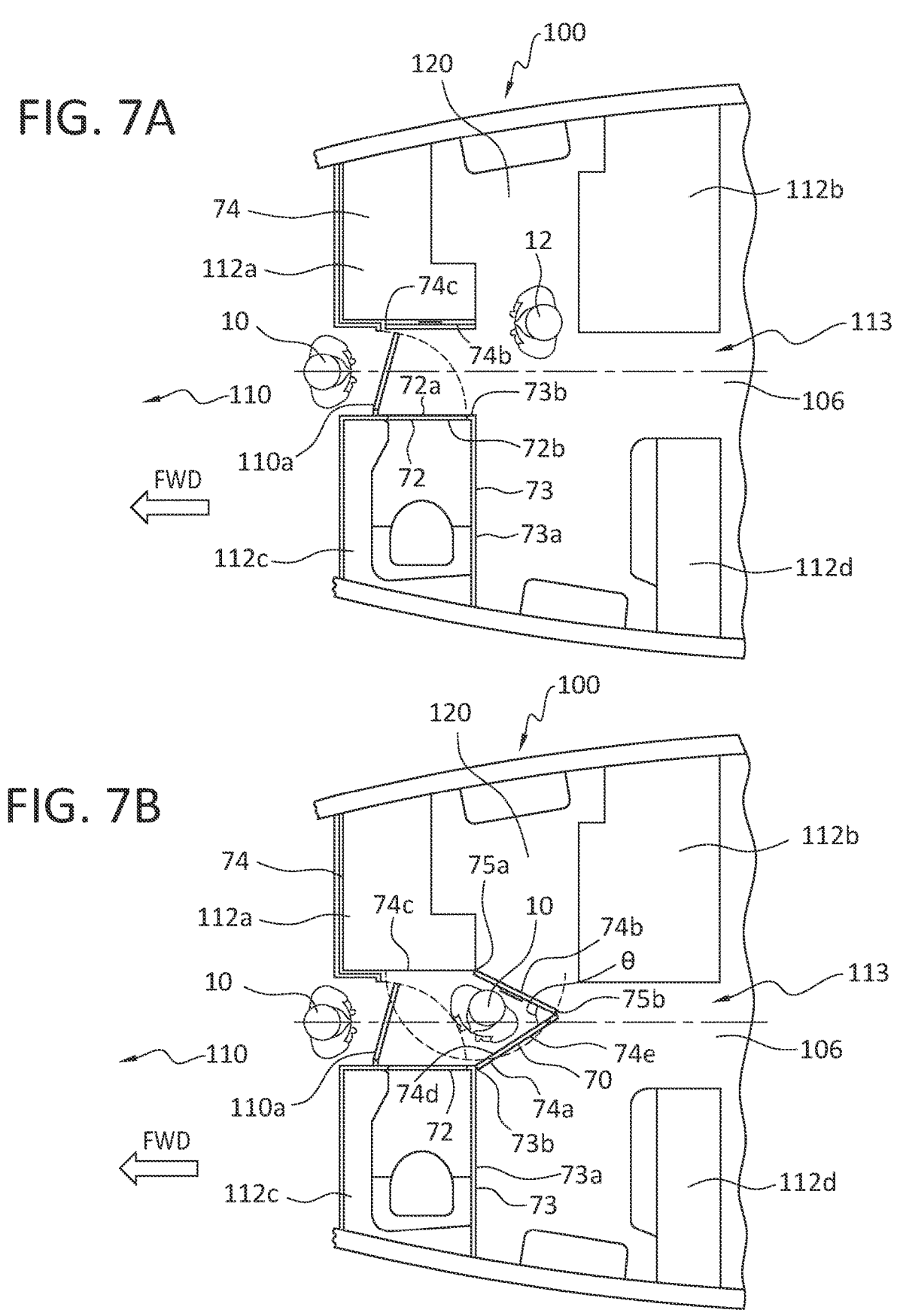
Figure 7C:
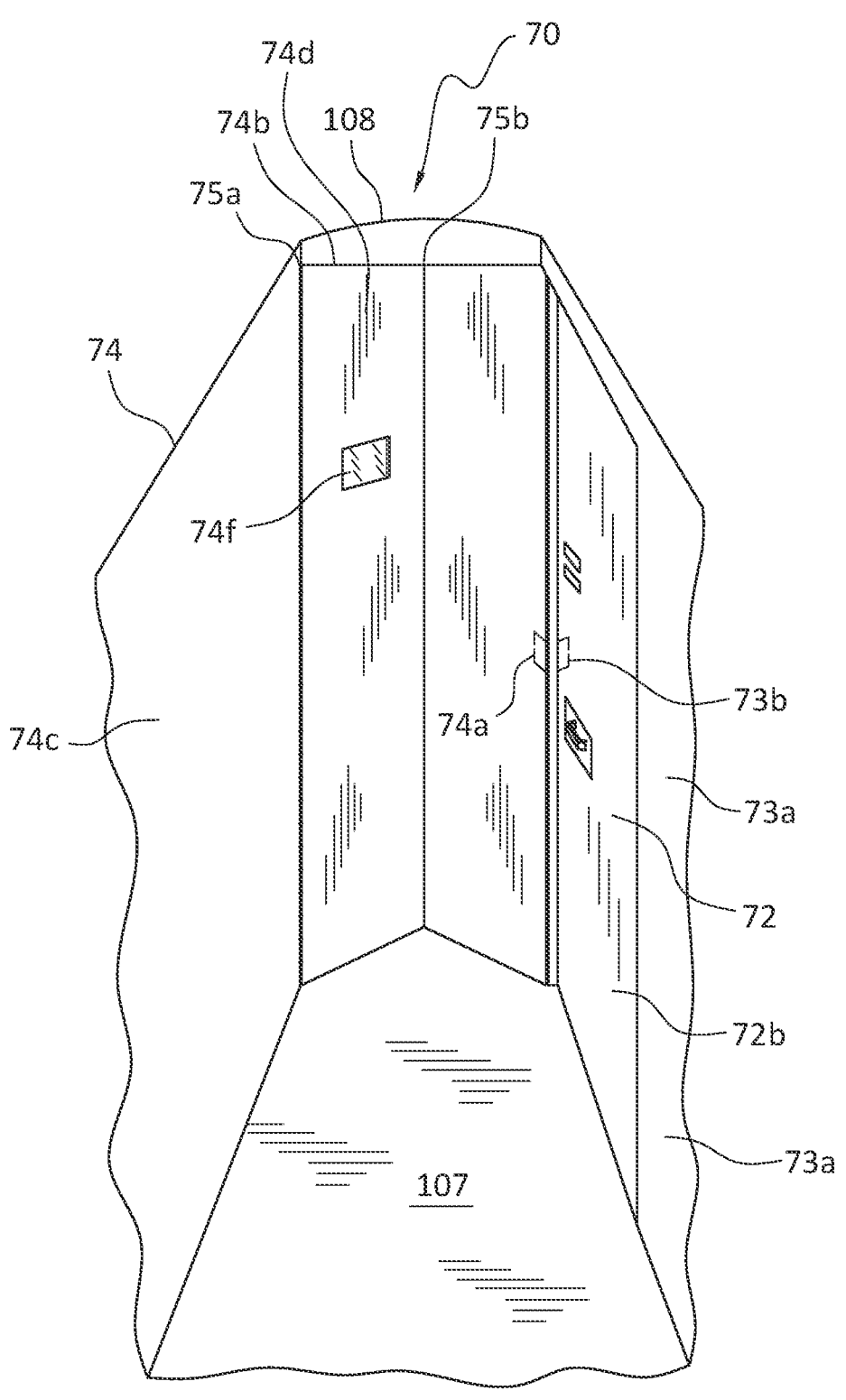
Figure 8:
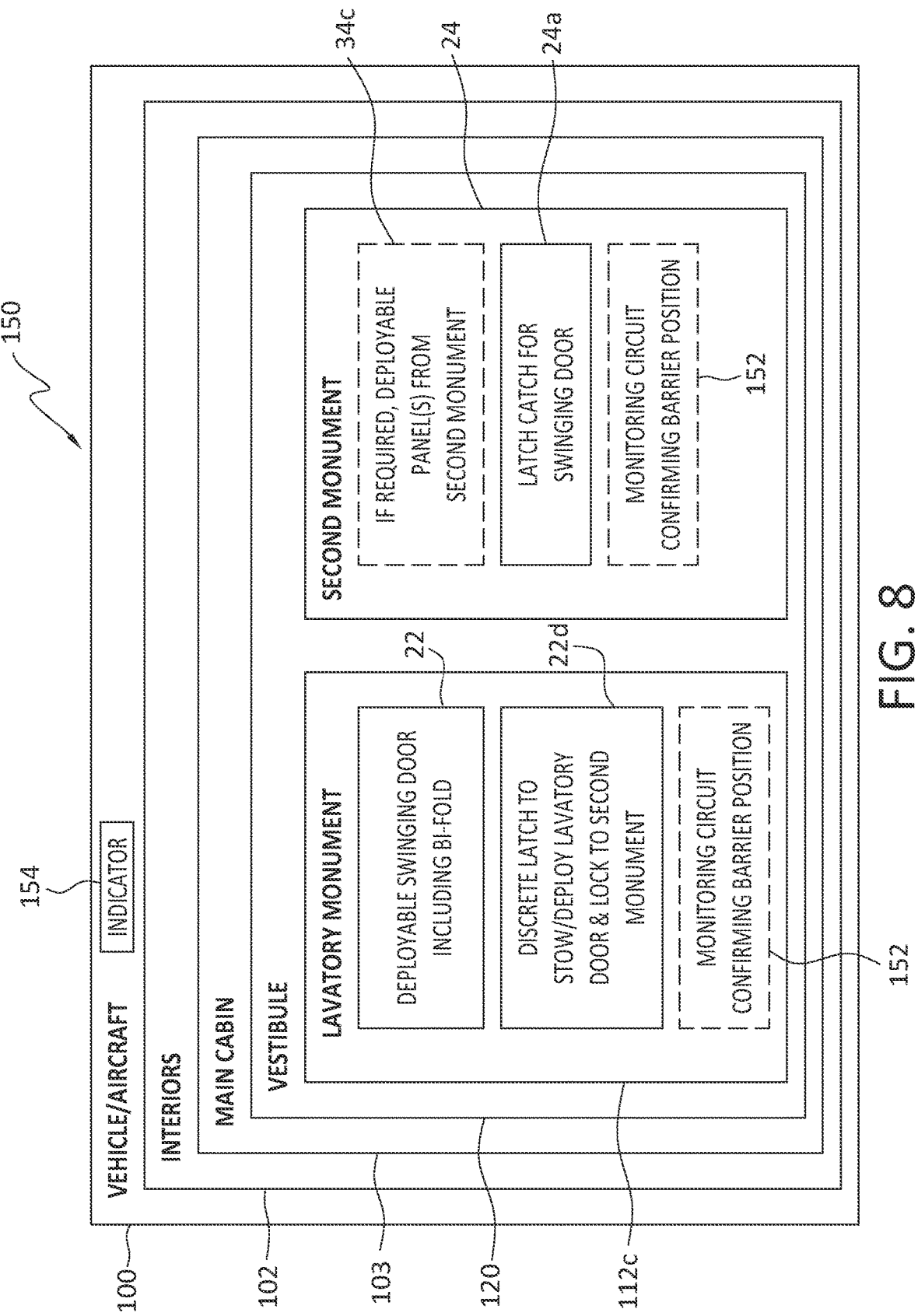
Figure 9:
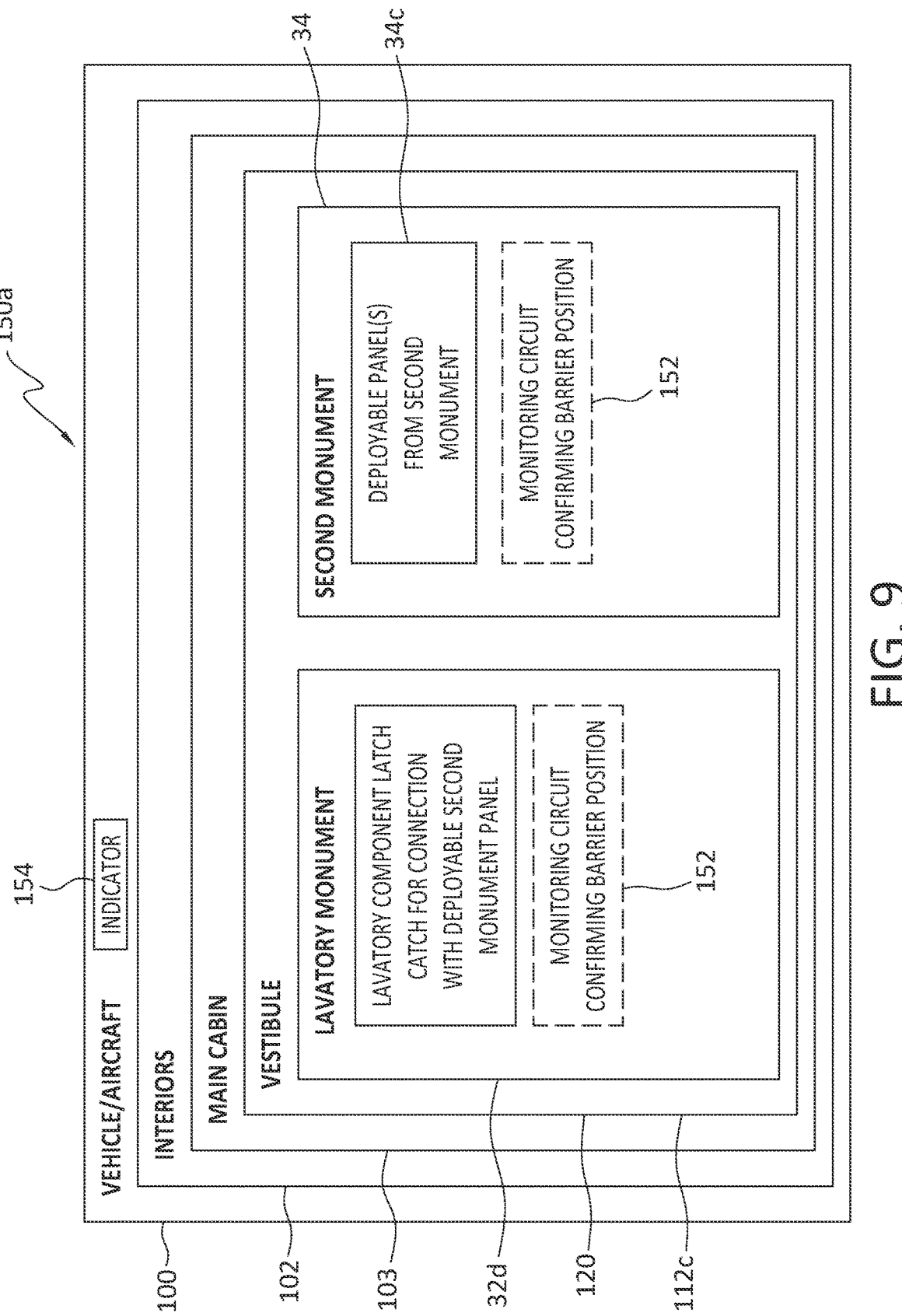
Figure 10:
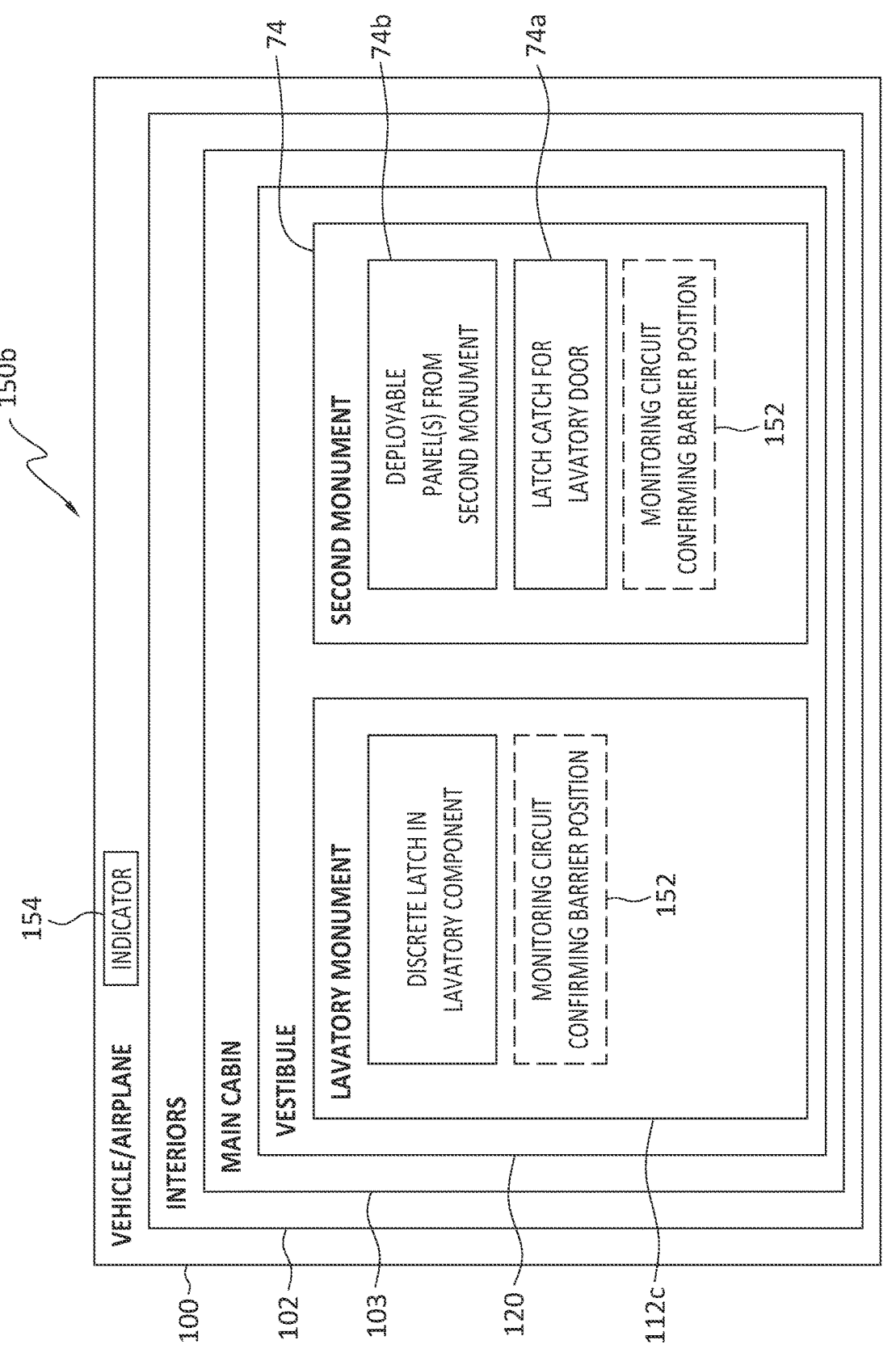
Figure 11:
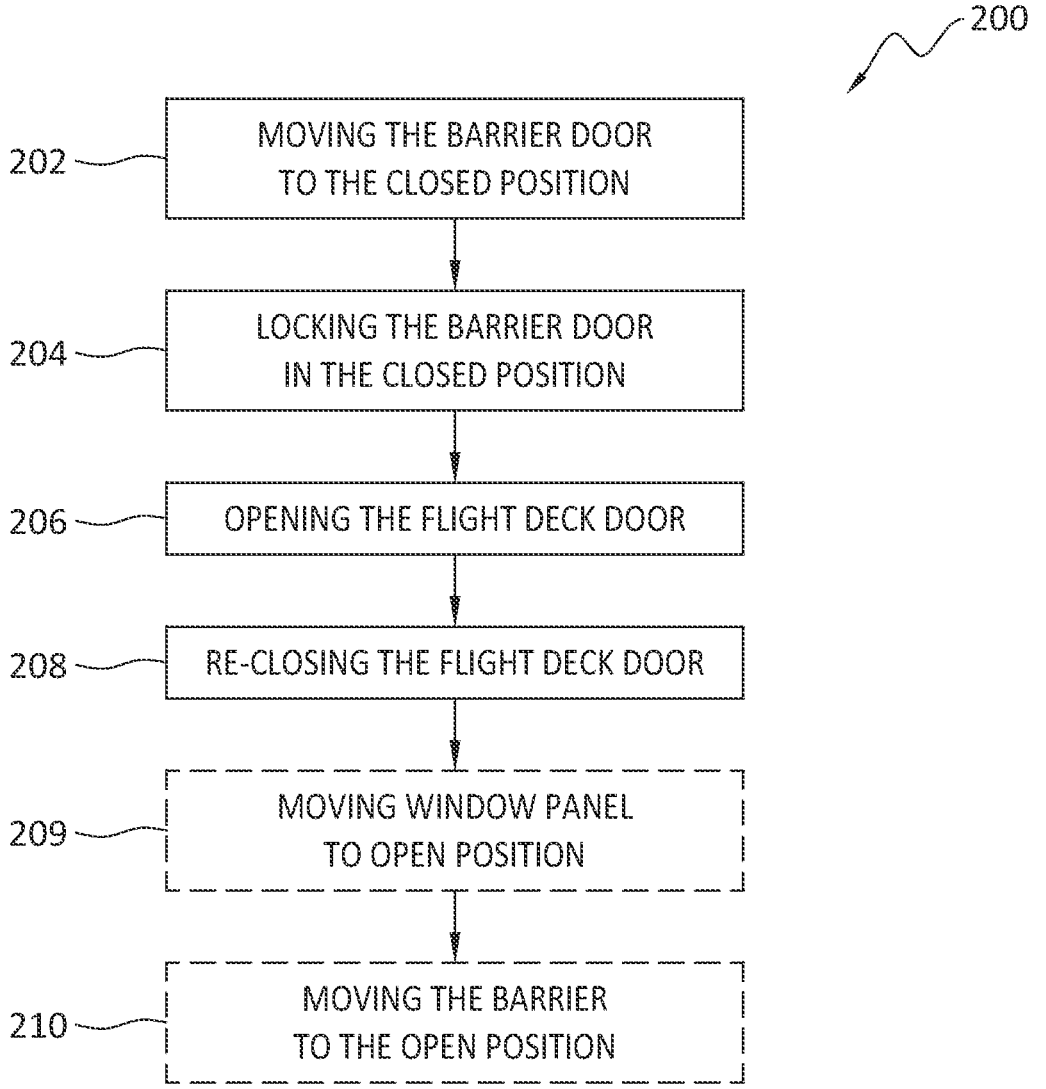
Figure 12:
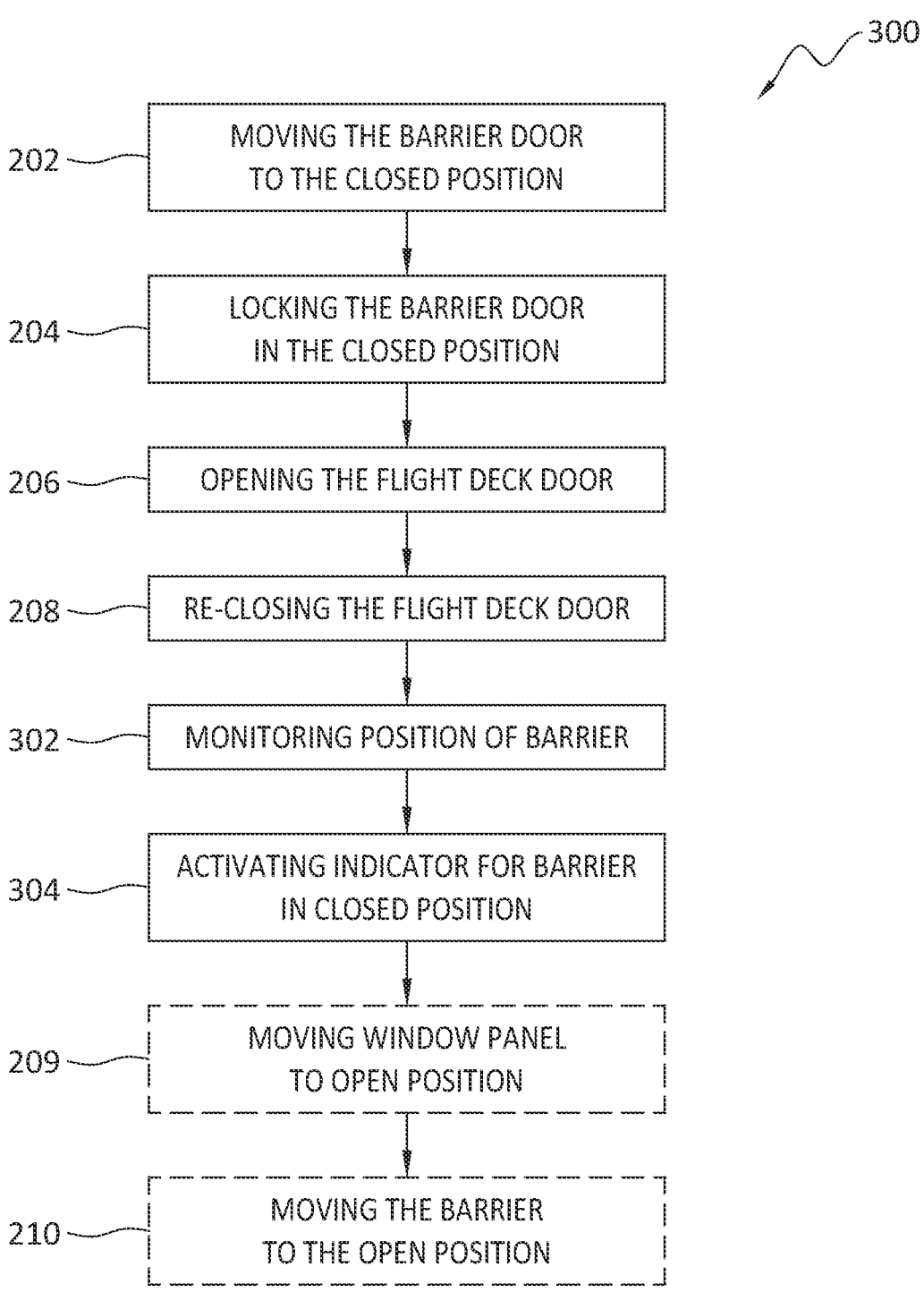
Figure 14:
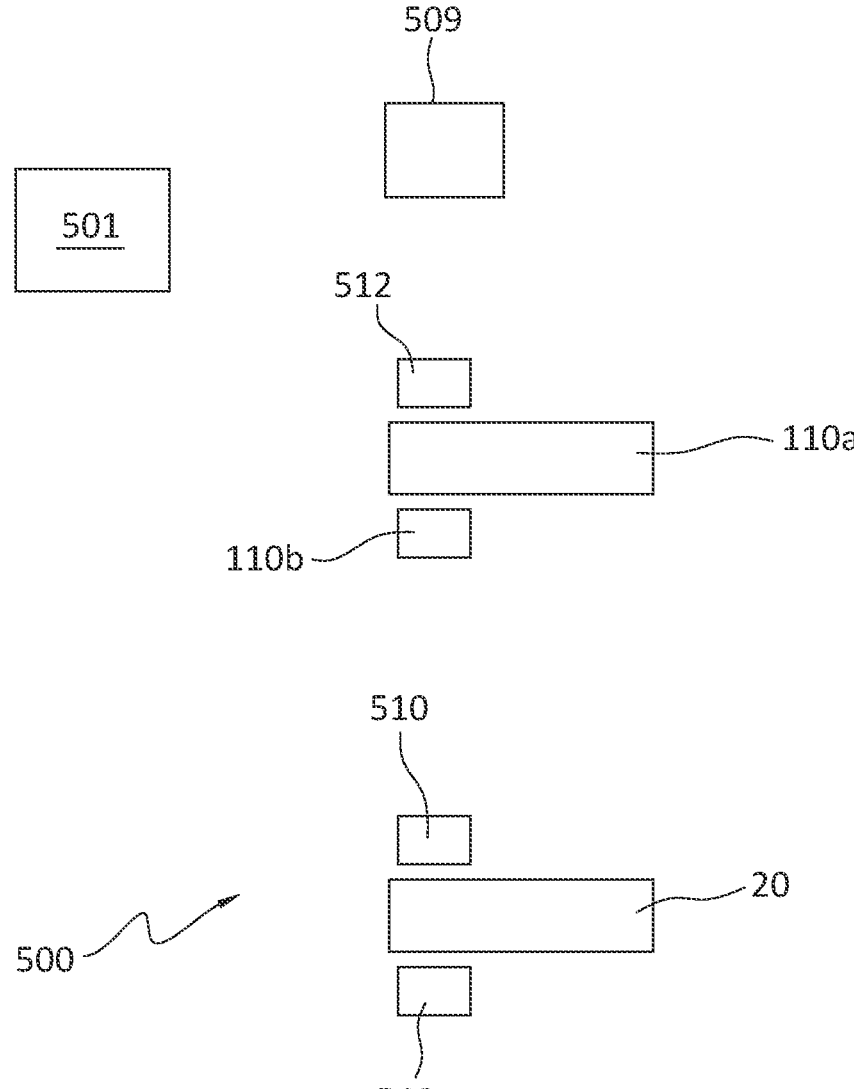
Figure 15:
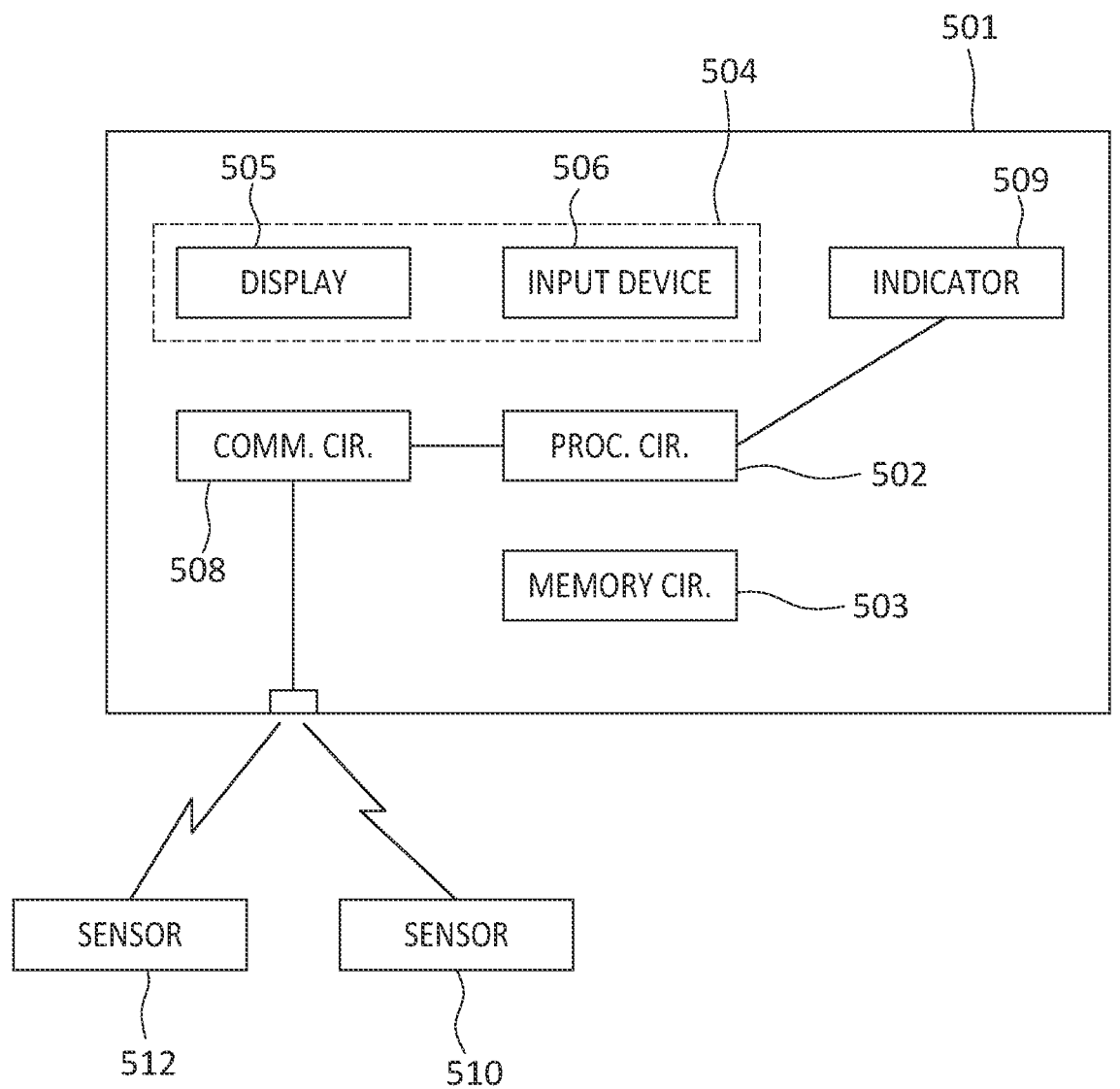

Having thus described variations of the disclosure in general terms, reference will now be made to the accompanying drawings, which are not necessarily drawn to scale, and wherein:

FIG. 1A is an illustration of a vehicle in the form of an aircraft, according to present aspects;

FIG. 1B is an overhead cross-sectional partial view of a forward section of an aircraft cabin of the type found within the exemplary aircraft shown in FIG. 1A and taken along line 1B-1B, according to present aspects;

FIG. 2A is an overhead cross-sectional partial view of an aircraft cabin of the type found within the exemplary aircraft shown in FIG. 1A taken along line 1B-1B, according to present aspects;

FIG. 2B is an overhead cross-sectional partial view of an aircraft cabin of the type found within the exemplary aircraft shown at least in FIG. 2A, with the deployed secondary barrier shown incorporating the dual purpose lavatory door, according to present aspects;

FIG. 2C is a view aft from within a vestibule area that is closed off by the deployed secondary barrier incorporating the dual purpose lavatory door barrier shown in FIG. 2B, according to present aspects;

FIG. 3A is an overhead cross-sectional partial view of an aircraft cabin of the type found within the exemplary aircraft shown in FIG. 1A taken along line 1B-1B, according to present aspects;

FIG. 3B is an overhead cross-sectional partial view of an aircraft cabin of the type found within the exemplary aircraft shown in FIG. 3A, with the deployed secondary barrier shown incorporating the dual purpose lavatory door, according to present aspects;

FIG. 3C is a view aft from within a vestibule area that is closed off by the deployed secondary barrier incorporating the dual purpose lavatory door barrier shown in FIG. 3B, according to present aspects;

FIG. 4A is an overhead cross-sectional partial view of an aircraft cabin of the type found within the exemplary aircraft shown in FIG. 1A taken along line 1B-1B, according to present aspects;

FIG. 4B is an overhead cross-sectional partial view of an aircraft cabin of the type found within the exemplary aircraft shown in FIG. 4A, with the deployed secondary barrier shown incorporating the dual purpose lavatory door, according to present aspects;

FIG. 4C is a view aft from within a vestibule area that is closed off by the deployed secondary barrier incorporating the dual purpose lavatory door barrier shown in FIG. 4B, according to present aspects;

FIG. 5A is an overhead cross-sectional partial view of an aircraft cabin of the type found within the exemplary aircraft shown in FIG. 1A taken along line 1B-1B, according to present aspects;

FIG. 5B is an overhead cross-sectional partial view of an aircraft cabin of the type found within the exemplary aircraft shown in FIG. 5A, with the deployed secondary barrier shown incorporating the dual purpose lavatory door, according to present aspects;

FIG. 5C is a view aft from within a vestibule area that is closed off by the deployed secondary barrier incorporating the dual purpose lavatory door barrier shown in FIG. 5B, according to present aspects;

FIG. 6A is an overhead cross-sectional partial view of an aircraft cabin of the type found within the exemplary aircraft shown in FIG. 1A taken along line 1B-1B, according to present aspects;

FIG. 6B is an overhead cross-sectional partial view of an aircraft cabin of the type found within the exemplary aircraft shown in FIG. 6A, with the deployed secondary barrier shown incorporating the dual purpose lavatory door, according to present aspects;

FIG. 6C is a view aft from within a vestibule area that is closed off by the deployed secondary barrier incorporating the dual purpose lavatory door barrier shown in FIG. 6B, according to present aspects;

FIG. 7A is an overhead cross-sectional partial view of an aircraft cabin of the type found within the exemplary aircraft shown in FIG. 1A taken along line 1B-1B, according to present aspects;

FIG. 7B is an overhead cross-sectional partial view of an aircraft cabin of the type found within the exemplary aircraft shown in FIG. 6A, with the deployed secondary barrier shown incorporating a dual purpose lavatory component, according to present aspects;

FIG. 7C is a view aft from within a vestibule area that is closed off by the deployed secondary barrier incorporating the dual purpose lavatory component barrier shown in FIG. 7B, according to present aspects;

FIG. 8 is a block diagram illustrating an aircraft and an aircraft cabin, according to present aspects;

FIG. 9 is a block diagram illustrating an aircraft and an aircraft cabin, according to present aspects;

FIG. 10 is a block diagram illustrating an aircraft and an aircraft cabin, according to present aspects;

FIG. 11 is a flowchart outlining a method, according to present aspects;

FIG. 12 is a flowchart outlining a method, according to present aspects;

FIG. 13 is a flowchart outlining a method, according to present aspects;

FIG. 14 is a schematic drawing of a monitoring system according to present aspects; and FIG. 15 is a schematic box drawing of a monitoring system, according to present aspects.

DETAILED DESCRIPTION

According to present aspects, an aircraft cabin barrier is disclosed to control and restrict the passage of persons onto a flight deck from a passenger cabin section or from within a vestibule area. The barrier is formed through the deployment of a dual purpose lavatory monument component that is deployed from an initial positioned configured as a lavatory monument component to a deployed position as a barrier extending away from the lavatory monument and into the vestibule and across an aisle located within the vestibule. In present examples, the dual purpose lavatory monument component is a lavatory monument door that is configured to convert from a primary use as an aircraft lavatory monument door into a dual function or dual purpose aircraft lavatory door barrier. In further examples, the aircraft lavatory monument component is a lavatory monument wall or other lavatory monument component that is configured to engage with and/or receive an aircraft cabin second monument component to complete a barrier formation across an aircraft aisle.

Present aspects afford significant advantages regarding the formation and use of the dual purpose lavatory door barrier as an additional or secondary barrier restricting access to positions forward of the deployed lavatory door barrier including, for example, a flight deck. Such advantages include, without limitation, the use of existing aircraft cabin structures for the structural formation of a secondary barrier, such that almost no additional weight is added to the aircraft to include the secondary barrier. In addition, retrofitting processes configured to include/add the presently disclosed barriers into an aircraft cabin and into aircraft comprising are significantly simplified as minimal hardware is required to convert a lavatory door into the dual purpose lavatory door barrier, without adding significant weight or cost.

According to present aspects, FIGS. 1A and 1B illustrate a vehicle in the form of an aircraft 100 that includes a fuselage 101. FIG. 1B is a partial cross-sectional view of aircraft 100 taken across line 1B-1B. As shown in FIGS. 1A and 1B, a flight deck 110 and flight deck door 110*a* are positioned at a front, or forward section, of the fuselage 101 and a cabin area 103 is positioned rearward (referred to equivalently herein as "aft"). The cabin area 103 is equipped for accommodating passengers. The size of the flight deck 110 and the cabin area 103 can vary depending upon the aircraft 100. One or more doors 104 provide for passengers to enter and exit the aircraft 100.

The flight deck 110 includes one or more crew seats 111 for the flight personnel including the pilot, co-pilot, and navigator. Various controls and instrument panels (not illustrated) are located for use by the pilot and co-pilot to control the aircraft 100.

The cabin area 103 is positioned along the fuselage 101 aft of the flight deck 110. The cabin area 103 includes a passenger section 121 with passenger seats 105 arranged in rows along one or more aisles 106. In some examples, including, for example, a commercial airline, the passenger seats 105 extend throughout the cabin area 103. In other examples in which the aircraft 100 is used for cargo transport, a limited number of passenger seats 105 are positioned in the cabin area 103.

The cabin area 103 also includes a vestibule 120 positioned between the flight deck 110 and the passenger section 121. In some examples, the vestibule 120 includes crew seats 111*a* for use by flight personnel such as flight attendants. The crew seats 111*a* can fold to be out of the way when not being used. The vestibule 120 includes one or more monuments 112*a*, 112*b*, 112*c*, 112*d* that are mounted to the structural members of the aircraft 100 within the fuselage 101. The monuments are functional units used during flight with examples including but not limited to galleys (112*a*,112*b*), lavatories (112*c*), and stowage units (112*d*), that can be, for example, closets, etc. In some examples, the monuments 112 are shaped and sized to extend from the floor 107 to the ceiling 108 (shown in FIGS. 2C, 3C, 4C, 5C, 6C, 7C) of the cabin area 103. In some examples, the monuments extend between a wall 114 of the fuselage 101 to an aisle 106. FIG. 1B further shows the vestibule 120 including a pair of galley monuments 112*a*, 112*b*, a lavatory monument 112*c*, and a stowage monument 112*d* that can be, for example, a closet.

A flight deck door 110*a* separates the flight deck 110 from the cabin area 103, and specifically separates the flight deck 110 from the vestibule 120. The flight deck door 110*a* prevents unintended persons from entering the flight deck 110 from the cabin area 103. FIG. 1B further illustrates an example with the opening 113 formed between a pair of monuments 112*b*, 112*d*. The opening 113 can be aligned with an aisle 106 to facilitate movement of passengers during boarding and exiting. The cabin area 103 further includes an opening 113 for passengers and flight personnel to pass through when moving between the vestibule 120 and the passenger section 121. The opening 113 can be formed between various components, such as monuments 112*a*, 112*b*, 112*c*, 112*d*, walls 114 of the fuselage 101, and passenger seats 105.

FIGS. 2A and 2B illustrate an overhead view of a vehicle cabin that can be in the form of an aircraft cabin of the type shown in FIG. 1B. As shown in FIGS. 2A and 2B galley monument 112*a* is further designated as an aircraft cabin second monument 24 that further comprises an aircraft cabin monument engagement point 24*a* that can be configured to receive or otherwise engage with (e.g., in a locking configuration, etc.) an aircraft cabin lavatory component of an aircraft cabin lavatory monument. As shown in FIG. 2A lavatory monument door 116 is in a closed configuration within the lavatory monument footprint. That is, in FIG. 2A, the lavatory monument door 116 is closed to form an enclosed lavatory monument 112*c*.

According to present aspects, the lavatory monument door or other lavatory monument component can be re-oriented in a lavatory door open state and configured to serve another use as an aircraft cabin barrier. The present aircraft cabin barrier is formed, at least in part, by a lavatory monument door or lavatory monument component that can be an attachment point on the lavatory door, or a portion of the lavatory monument wall immediately adjacent the lavatory door.

According to present aspects, as the lavatory monument door is configured from a closed position within the lavatory monument footprint, to an open position, the lavatory monument door pivots outwardly, and away from the lavatory monument (e.g., about a hinge that can be a separate hinge or an integral hinge, etc.) into a deployed lavatory component position (referred to equivalently herein as the lavatory monument component aircraft cabin barrier configuration) as the lavatory monument component is configured to contact and engage with an aircraft cabin second monument component of an aircraft cabin second monument to form the aircraft cabin barrier that can be a secondary barrier. The second monument component can be, for example, a second monument wall or a second component panel extending from the second monument.

The aircraft second monument is positioned a selected distance from, and across an aisle, from the lavatory monument. When the lavatory monument component engages the aircraft cabin second monument (e.g., and is releasably secured, and/or locked, into a fixed position with the second monument) an aircraft cabin barrier is established that blocks passage of a person along the aircraft aisle from, for example, the passenger cabin and/or aft sections of the vestibule area, toward a location forward of the established barrier including sections of the vestibule and the flight deck.

When the lavatory monument component is a lavatory monument door, the door can be a single door panel. In addition, according to present aspects, the door can be one or more door panels that can be joined via hinges about which the door panels can be articulated in a selected fashion to unfold to form the lavatory monument component barrier configuration. In further examples, the hinges can be separate hardware features. In other examples, the hinges can be integral hinged regions between and incorporated into door panels such that the adjoining door panels that are in communication with the hinges or hinged regions can be configured to bend in a selected orientation allowing adjoining door panels to move and/or bend with respect to one another.

In one example, shown in FIGS. 2A and 2B, an aircraft cabin lavatory monument 112c is located across aisle 106 from an aircraft cabin second monument 24 that is a galley monument 112a. FIG. 2A shows the aircraft cabin lavatory monument door 116 in a closed configuration within the lavatory monument footprint. At times, during flight, conditions can call for establishing a barrier (e.g., a secondary barrier) that can control and restrict movement of persons from areas within a vestibule 120 to locations forward of the vestibule 120 including the flight deck 110.

When conditions call for establishing such a barrier, as shown in FIG. 2B, the lavatory monument component 22 in the form of lavatory monument door 22 is moved out of the closed position and pivoted outwardly through an open position. The lavatory monument component 22 (shown in FIG. 2B as a lavatory door 22) comprises lavatory door first side 22a (the "inside" of the door also referred to as the forward side of the door with respect to the aircraft when the door is in the barrier configuration), and a lavatory door second side 22b (the "outside" of the door also referred to as the "aft" side of the door when the door is moved into the barrier configuration.) The lavatory door 22 further comprises a lavatory door first vertical edge 22c that can be the "hinged" edge (e.g., the door "edge" having attached or integral hinges), and a lavatory door second vertical edge 22d. Lavatory door second vertical edge 22d further comprises a mating component that is configured to releasably engage a second monument engagement point, for example, in a locked configuration.

FIG. 2A shows a passenger 12 located in an area of the vestibule 120, and a flight crew 10 located on the forward side of flight deck door 110a of flight deck 110. FIG. 2B illustrates the flight crew 10 moving from a position forward of the flight deck door 110a and into the lavatory monument 112c after the lavatory door 22 has been re-purposed and re-oriented and otherwise configured into a position outside of the lavatory monument footprint and into position to complete secure barrier 20, and passenger 12 is unable to proceed forward along aisle 106 past barrier 20.

That is, as shown in FIG. 2B upon completion of the formation of barrier 20 that includes lavatory door 22 in the barrier configuration, the barrier controls and restricts movement of persons/passengers forward of the established barrier. When desired, (e.g., when barrier 20 is no longer desired, etc.) the lavatory door can disengage (e.g., unlock) from the second monument engagement point, and return to function as a lavatory door and return to a position within the lavatory monument footprint.

FIG. 2C shows a view "aft" from within the barrier 20 established when the lavatory monument door 22 is secured into an engaged position with second monument wall 24b of the second monument 24 at the second monument engagement point 24a (engaged with the lavatory door second vertical edge 22d) comprising a mating locking mechanism configured to mate and/or lock with the second monument engagement point 24a. Lavatory monument door 22 further comprises a lavatory monument door/barrier through opening 22e that extends from the lavatory door monument first side 22a (the door "inside") to the lavatory monument door second side 22b (the door "outside" not shown in FIG. 2C) that can be occupied with a transparent window. Sliding panel frame 22g houses and otherwise maintains a sliding panel 22f that can be manipulated from inside the lavatory monument and that can be manipulated from inside barrier 20 between an open and a closed position. In an open position, the lavatory monument door/barrier through opening permits viewing access of locations aft of the barrier from within the barrier as well as permitting viewing access into locations forward of the barrier from outside of the barrier (e.g., positions aft of the barrier).

Present aspects contemplate the conversion of the dual purpose lavatory monument door from a lavatory door into a barrier without limitation due that can arise to the dimension of the second monument (e.g., the galley) positioned across the aisle from the aircraft cabin second monument can further comprise one or more second monument panels that can move (e.g. pivot laterally, etc.) through a range of motion from a stowed position adjacent to a second monument wall (and substantially within the second monument footprint) toward a deployed position away from the second monument for the purpose of facilitating engagement of the second monument with the lavatory monument door (e.g., facilitating engagement of the lavatory monument door with the second monument via the second monument panel in the deployed position, etc.). FIGS. 3A, 3B, 3C, 4A, 4B, 4C, 5A, 5B, 5C, and 6A, 6B, 6C illustrate the use of one or more second monument panels engaging with the dual purpose lavatory monument door to establish barriers 30, 40, 50, and 60, that can be secondary barriers.

FIGS. 3A and 3B illustrate another present example of the formation of a secondary barrier by converting the lavatory monument door into position with the second monument to form a barrier 30, with FIGS. 3A and 3B showing the addition of second monument panel 34c present and in movable communication with second monument 34, and with the second monument panel 34c comprising the attachment/engagement point for the attachment of the deployed lavatory monument door (at the lavatory monument door second vertical edge) to form barrier 30. As shown in FIG. 3A, an aircraft cabin lavatory monument 112c is located across aisle 106 from an aircraft cabin second monument 34 that is a galley monument 112a having a footprint that is different from aircraft cabin second galley monument 24. FIG. 3A shows the aircraft cabin lavatory monument door 32 in a closed configuration within the lavatory monument footprint of lavatory monument 112c.

When conditions onboard call for establishing a barrier that can be a secondary barrier, as shown in FIG. 3B, the lavatory monument component in the form of lavatory monument door 32 is moved out of the closed position and pivoted outwardly through an open position. The lavatory monument door 32 comprises lavatory door first side 32a (the "inside" of the door also referred to as the forward side of the door with respect to the aircraft when the door is in the barrier configuration), and a lavatory door second side 32b (the "outside" of the door also referred to as the "aft" side of the door when the door is moved into the barrier configuration). The lavatory door 32 further comprises a lavatory door first vertical edge 32c that can be the "hinged" edge (e.g., the door "edge" having attached or integral hinges), and a lavatory door second vertical edge 32d. Lavatory door second vertical edge 32d further comprises a mating component that is configured to releasably engage with a second monument engagement point 34a that is located within second monument panel 34c, for example, in a locked configuration. FIG. 3B further shows second monument panel 34c in movable communication with second monument wall 34b about a second monument wall hinge 34d, with the second monument panel moved from a stowed position (shown in FIG. 3A) into the second monument panel deployed configuration that is a position that is pivoted laterally away from the second monument wall 34b, and into a deployed second monument panel position that is substantially perpendicular to the deployed lavatory monument door, and to engage with lavatory monument door second vertical edge 32d forming an engagement angle between the second monument panel that, as shown in FIG. 3B, is an engagement at an angle of about 90 degrees; "θ", shown in FIG. 3B.

FIG. 3A shows flight crew 10 and passenger 12 as shown and described in FIGS. 2A and 2B. As shown in FIG. 3B, upon completion of the formation of barrier 30 that includes lavatory monument door 32 in the barrier configuration, the barrier 30 that is established controls and restricts movement of persons/passengers forward of the established barrier 30, and passenger 12 is unable to proceed forward along aisle 106 past barrier 30.

When desired, (e.g., when barrier 30 is no longer desired, etc.) the lavatory door can disengage (e.g., unlock) from the second monument engagement point, and return to function as a lavatory door and return to a position within the lavatory monument footprint.

FIG. 3C shows a view "aft" from within the barrier 30 established when the lavatory monument door 32 is secured into an engaged position with second monument panel 34c of the second monument 34 at the second monument engagement point 34a (and engaged with the lavatory door second vertical edge 32d) comprising a mating locking mechanism configured to mate and/or lock with the second monument engagement point 34a. Lavatory monument door 32 further comprises a lavatory monument door/barrier through opening 32e that extends from the lavatory door monument first side 32a (the door "inside") to the lavatory monument door second side 32b (the door "outside" not shown in FIG. 3C) that can be occupied with a transparent window. Sliding panel frame 32g houses and otherwise maintains a sliding panel 32f that can be manipulated from inside the lavatory monument and that can be manipulated from inside barrier 30 between an open and a closed position. In an open position, the lavatory monument door/ barrier through opening permits viewing access of locations aft of the barrier 30 from within the barrier 30, as well as permitting viewing access into locations forward of the barrier from outside of the barrier (e.g., from positions aft of the barrier).

While FIG. 3B shows the establishment of barrier 30 formed by an engagement of the lavatory monument door 32 with the second monument panel at an engagement angle of about 90 degrees, present aspects contemplate further engagement configurations where the engagement angle between monuments is not 90 degrees. Such barrier configurations where the engagement angle between monuments is not 90 degrees and where the engagement angle formed is, for example an acute angle "θ", can create additional space within and forward of the established barrier (e.g., a larger "footprint" being established within the blocked region of the vestibule, as features of the barrier extend further "aft" into the vestibule than, for example, the barriers 20, 30, shown in FIGS. 2B, 3B, respectively).

According to a present aspect, one such configuration of a barrier having the larger "footprint" is shown in FIGS. 4A, 4B with the establishment of barrier 40 created by the re-positioning and configuration of dual purpose lavatory monument door 42 engaged with second monument panel 44 to form barrier 40. As shown in FIGS. 4A, 4B, a barrier formation and configuration is presented, according to one aspect, where the engagement angle formed dual purpose lavatory monument door 42 engaged with second monument panel 44 is, for example an acute angle "θ", and can create additional space within and forward of the established barrier.

As shown in FIG. 4A, an aircraft cabin lavatory monument 112c is located across aisle 106 from an aircraft cabin second monument 44 that is a galley monument 112a. FIG. 4A shows the aircraft cabin lavatory monument door 42 in a closed configuration within the lavatory monument footprint of lavatory monument 112c.

When conditions onboard call for establishing a barrier that can be a secondary barrier, as shown in FIG. 4B, the lavatory monument component in the form of lavatory monument door 42 is moved out of the closed position and pivoted outwardly toward an open position. The lavatory monument door 42 comprises lavatory door first side 42a (the "inside" of the door also referred to as the forward side of the door with respect to the aircraft when the door is in the barrier configuration), and a lavatory door second side 42b (the "outside" of the door also referred to as the "aft" side of the door when the door is moved into the barrier configuration). The lavatory door 42 further comprises a lavatory door first vertical edge 42c that can be the "hinged" edge (e.g., the door "edge" having attached or integral hinges), and a lavatory door second vertical edge 42d. Lavatory door second vertical edge 42d further comprises a mating component that is configured to releasably engage with a second monument engagement point 44a, for example, in a locked configuration.

FIG. 4B further shows second monument panel 44c in movable communication with second monument wall 44b about a second monument wall hinge 44d, with the second monument panel moved from a stowed position (shown in FIG. 4A) into the second monument panel deployed configuration that is a position that is pivoted laterally away from the second monument wall 44b, and into a deployed second monument panel position to engage with lavatory monument door second vertical edge 42d forming an engagement angle between the second monument panel that, as shown in FIG. 4B, is an engagement at an acute of less than about 90 degrees; "θ". In one example, the acute angle "θ" shown in FIG. 4B can range from about 30 degrees to about 80 degrees.

FIG. 4A shows flight crew 10 and passenger 12 as shown and described in present FIGS. 2A, 2B, 3A, 3B with the additional recognition that in FIG. 4B, when on the forward side of completed barrier 40, flight crew personnel 10 can maneuver from flight deck 110 through flight deck door 110a and into lavatory monument 112c with greater ease as barrier 40 can have a larger footprint (and more room "inside" or forward of the barrier) than barriers 20, 30, and passenger 12 is unable to proceed forward along aisle 106 past barrier 40.

That is, as shown in FIG. 4B, upon completion of the formation of barrier 40 that includes lavatory monument door 42 in the barrier configuration, the barrier 40 that is established controls and restricts movement of persons/passengers from the passenger cabin to positions forward of the established barrier 40 (for example, along aisle 106). When desired, (e.g., when barrier 40 is no longer desired, etc.) the lavatory door 42 can disengage (e.g., unlock) from the second monument engagement point 44a, and return to function as a lavatory door in lavatory monument 112c and return to a position within the footprint of lavatory monument 112c.

FIG. 4C shows a view "aft" from within the barrier 40 established when the lavatory monument door 42 is secured into an engaged position with second monument panel 44c of the second monument 44 at the second monument engagement point 44a and engaged with the lavatory door second vertical edge 42d that can comprise a mating locking mechanism configured to mate and/or lock with the second monument engagement point 44a. Second monument panel 44c further comprises second monument panel first side 44e (e.g., the "inner side" when the panel is deployed) and second monument panel second side 44f (e.g., the "outer side" when the panel is deployed). Lavatory monument door 42 further comprises a lavatory monument door/barrier through opening 42e of similar type and function as through openings 22e, 32e as shown and described herein with respect to FIGS. 2C, 3C respectively. That is, through opening 42e can extend from the lavatory door monument first side 42a (the door "inside") to the lavatory monument door second side 42b (the door "outside" not shown in FIG. 4C). Through opening 42e can be occupied with a transparent window. Sliding panel frame 42g houses and otherwise maintains a sliding panel 42f that can be manipulated from inside the lavatory monument and that can be manipulated from inside barrier 40 between an open and a closed position. In an open position, the lavatory monument door/barrier through opening permits viewing access of locations aft of the barrier 40 from within the barrier 40, as well as permitting viewing access into locations forward of the barrier 40 from outside of the barrier 40 (e.g., from positions aft of the barrier 40).

In another example (not shown in FIG. 4C), the second monument panel of barrier 40 can have a through opening similar to 42e through the thickness of the second monument panel in addition to or in place of the through opening in the lavatory monument door 42.

FIGS. 5A, 5B (showing the establishment of barrier 50) are similar to FIGS. 4A, 4B (showing the formation of barrier 40), with the difference shown in FIGS. 5A, 5B being the deployment of a second monument multi-section panel 54b (shown as a second monument bi-fold panel) extending/deploying from the second monument 54, one bi-fold panel of which engages with lavatory door monument 52 to form barrier 50, that can be a secondary barrier.

According to a present aspect, FIGS. 5A, 5B show another example of the formation and configuration of a barrier (this time, barrier 50) having the larger "footprint" is shown in with the establishment of barrier 50 created by the re-positioning and configuration of dual purpose lavatory monument door 52 engaged with second monument panel 54 to form barrier 50. As shown in FIGS. 5A, 5B, a barrier formation and configuration is presented, according to one aspect, where the engagement angle formed dual purpose lavatory monument door 52 engaged with second monument bi-fold panel 54c is, for example an acute angle "θ", and can create additional space within and forward of the established barrier.

As shown in FIG. 5A, an aircraft cabin lavatory monument 112c is located across aisle 106 from an aircraft cabin second monument 54 that is a galley monument 112a. FIG. 5A shows the aircraft cabin lavatory monument door 52 in a closed configuration within the lavatory monument footprint of lavatory monument 112c.

When conditions onboard call for establishing a barrier that can be a secondary barrier, as shown in FIG. 5B, the lavatory monument component in the form of lavatory monument door 52 is moved out of the closed position and pivoted outwardly toward an open position. The lavatory monument door 52 comprises lavatory door first side 52a (the "inside" of the door also referred to as the forward side of the door with respect to the aircraft when the door is in the barrier configuration), and a lavatory door second side 52b (the "outside" of the door also referred to as the "aft" side of the door when the door is moved into the barrier configuration. The lavatory door 52 further comprises a lavatory door first vertical edge 52c that can be the "hinged" edge (e.g., the door "edge" having attached or integral hinges), and a lavatory door second vertical edge 52d. Lavatory door second vertical edge 52d further comprises a mating component that is configured to releasably engage with a second monument engagement point 54a (of the second monument bi-fold panel 54b), for example, in a locked configuration.

FIG. 5B further shows second monument bi-fold panel 54c in movable communication with second monument wall 54b about a second monument wall hinge 54d, with the second monument panel moved from a stowed position (shown in FIG. 5A) into the second monument panel deployed configuration that is a position that is pivoted laterally away from the second monument wall 54b, and into a deployed second monument panel position to engage with lavatory monument door second vertical edge 52d forming an engagement angle between the second monument panel that, as shown in FIG. 5B, is an engagement at an acute angle of less than about 90 degrees; "θ". In one example, the acute angle "θ" shown in FIG. 5B can range from about 30 degrees to about 80 degrees.

FIG. 5A shows flight crew 10 and passenger 12 as shown and described in present FIGS. 2A, 2B, 3A, 3B with the additional recognition that in FIG. 5B, when on the forward side of completed barrier 50, flight crew personnel 10 can maneuver from flight deck 110 through flight deck door 110a and into lavatory monument 112c with greater ease as barrier 50 can have a larger footprint (and more room "inside" or forward of the barrier) than barriers 20, 30, and passenger 12 is unable to proceed forward along aisle 106 past barrier 50.

That is, as shown in FIG. 5B, upon completion of the formation of barrier 50 that includes lavatory monument door 52 in the barrier configuration, the barrier 50 that is established controls and restricts movement of persons/passengers from the passenger cabin to positions forward of the established barrier 50 (for example, along aisle 106). When desired, (e.g., when barrier 50 is no longer desired, etc.) the lavatory door 52 can disengage (e.g., unlock) from the second monument engagement point 54a, and return to function as a lavatory door in lavatory monument 112c and return to a position within the footprint of lavatory monument 112c.

FIG. 5C shows a view "aft" from within the barrier 50 established when the lavatory monument door 52 is secured into an engaged position with second monument bi-fold panel 54c of the second monument 54 at the second monument engagement point 54a and engaged with the lavatory door second vertical edge 52d that can comprise a mating locking mechanism configured to mate and/or lock with the second monument engagement point 54a. Second monument bi-fold panel 54c further comprises second monument bi-fold panel first side 54e (e.g., the "inner side" when the panel is deployed) and second monument bi-fold panel second side 54f (e.g., the "outer side" when the panel is deployed). Lavatory monument door 52 further comprises a lavatory monument door/barrier through opening 52e of similar type and function as through openings 22e, 32e, 42e as shown and described herein with respect to FIGS. 2C, 3C, 4C, respectively. That is, through opening 52e can extend from the lavatory door monument first side 52a (the door "inside") to the lavatory monument door second side 52b (the door "outside" not shown in FIG. 5C). Through opening 54e can be occupied with a transparent window. Sliding panel frame 52g houses and otherwise maintains a sliding panel 52f that can be manipulated from inside the lavatory monument and that can be manipulated from inside barrier 50 between an open and a closed position. In an open position, the lavatory monument door/barrier through opening permits viewing access of locations aft of the barrier 50 from within the barrier 50, as well as permitting viewing access into locations forward of the barrier 50 from outside of the barrier 50 (e.g., from positions aft of the barrier 50).

In another example (not shown in FIG. 5C), the second monument panel of barrier 50 can have a through opening similar to 52e through the thickness of one or more of the second monument bi-fold panel 54c in addition to or in place of the through opening in the lavatory monument door 52.

FIGS. 6A, 6B (showing the establishment of barrier 60) are similar to FIGS. 5A, 5B (showing the formation of barrier 50), with the difference shown in FIGS. 6A, 6B being the deployment of a multi-section lavatory monument bi-fold door 62 to form barrier 60, that can be a secondary barrier.

According to a present aspect, FIGS. 6A, 6B show another example of the formation and configuration of a barrier (this time, barrier 60) having the larger "footprint" is shown in with the establishment of barrier 60 created by the re-positioning and configuration of dual purpose lavatory monument bi-fold door 62 engaged with second monument 64. to form barrier 60. As shown in FIGS. 6A, 6B, a barrier formation and configuration is presented, according to one aspect, where the engagement angle formed dual purpose lavatory monument door 62 engaged with second monument bi-fold panel 64c is, for example an acute angle "θ", and can create additional space within and forward of the established barrier.

As shown in FIG. 6A, an aircraft cabin lavatory monument 112c is located across aisle 106 from an aircraft cabin second monument 64 that is a galley monument 112a. FIG. 6A shows the aircraft cabin lavatory monument bi-fold door 62 in a closed configuration within the lavatory monument footprint of lavatory monument 112c.

When conditions onboard call for establishing a barrier that can be a secondary barrier, as shown in FIG. 6B, the lavatory monument component in the form of lavatory monument bi-fold door 62 is moved out of the closed position and pivoted outwardly toward an open position. The lavatory monument bi-fold door 62 comprises lavatory door first side 62a (the "inside" of the door also referred to as the forward side of the bi-fold door with respect to the aircraft when the door is in the barrier configuration), and a lavatory monument bi-fold door second side 62b (the "outside" of the bi-fold door also referred to as the "aft" side of the bi-fold door when the door is moved into the barrier configuration). The lavatory door 62 further comprises a lavatory bi-fold door first vertical edge 62c that can be the "hinged" edge (e.g., the door "edge" having attached or integral hinges), and a lavatory bi-fold door second vertical edge 62d. Lavatory bi-fold door second vertical edge 62d further comprises a mating component that is configured to releasably engage with a second monument engagement point 64a (of the second monument bi-fold panel 64c), for example, in a locked configuration.

FIG. 6B further shows second monument bi-fold panel 64c in movable communication with second monument wall 64b about a second monument wall hinge 64d, with the second monument panel moved from a stowed position (shown in FIG. 6A) into the second monument panel deployed configuration that is a position that is pivoted laterally away from the second monument wall 64b, and into a deployed second monument panel position that is substantially perpendicular to the deployed lavatory monument bi-fold door, and to engage with lavatory monument bi-fold door second vertical edge 62d forming an engagement angle between the second monument panel that, as shown in FIG. 6B, is an engagement at an acute angle of less than about 90 degrees; "θ". In one example, the acute angle "θ" shown in FIG. 6B can range from about 30 degrees to about 80 degrees.

FIG. 6A shows flight crew 10 and passenger 12 as shown and described in present FIGS. 2A, 2B, 3A, 3B with the additional recognition that in FIG. 6B, when on the forward side of completed barrier 60, flight crew personnel 10 can maneuver from flight deck 110 through flight deck door 110a and into lavatory monument 112c with greater ease as barrier 60 can have a larger footprint (and more room "inside" or forward of the barrier) than barriers 20, 30, and passenger 12 is unable to proceed forward along aisle 106 past barrier 60.

That is, as shown in FIG. 6B, upon completion of the formation of barrier 60 that includes lavatory monument bi-fold door 62 in the barrier configuration, the barrier 60 that is established controls and restricts movement of persons/passengers from the passenger cabin to positions forward of the established barrier 60 (for example, along aisle 106). When desired, (e.g., when barrier 60 is no longer desired, etc.) the lavatory bi-fold door 62 can disengage (e.g., unlock) from the second monument engagement point 64a, and return to function as a lavatory door in lavatory monument 112c and return to a position within the footprint of lavatory monument 112c.

FIG. 6C shows a view "aft" from within the barrier 60 established when the lavatory monument bi-fold door 62 is secured into an engaged position with second monument bi-fold panel 64*c* of the second monument 64 at the second monument engagement point 64*a* and engaged with the lavatory door second vertical edge 62*d* that can comprise a mating locking mechanism configured to mate and/or lock with the second monument engagement point 64*a*. Lavatory monument door 62 further comprises a lavatory monument bi-fold door/barrier through opening 62*e* of similar type and function as through openings 22*e*, 32*e* as shown and described herein with respect to FIGS. 2C, 3C respectively. That is, through opening 62*e* can extend from the lavatory monument bi-fold door first side 62*a* (the door "inside") to the lavatory monument bi-fold door second side 62*b* (the door "outside" not shown in FIG. 6C). Through opening 62*e* can be occupied with a transparent window. Sliding panel frame 62*g* houses and otherwise maintains a sliding panel 62*f* that can be manipulated from inside the lavatory monument and that can be manipulated from inside barrier 60 between an open and a closed position. In an open position, the lavatory monument bi-fold door/barrier through opening permits viewing access (e.g., visual access) into locations aft of the barrier 60 from within the barrier 60, as well as permitting viewing access into locations forward of the barrier 60 from outside of the barrier 60 (e.g., from positions aft of the barrier 60).

In another example (not shown in FIG. 6C), one or more of the second monument bi-fold panel(s) of barrier 60 can have a though opening similar to 62*e* through the thickness of one or more of the second monument bi-fold panel(s) 64*c* in addition to or in place of the through opening in the lavatory monument bi-fold door 62.

While present aspects are shown where a majority of a lavatory monument door is deployed as a dual purpose lavatory monument door that is converted or otherwise repurposed into a barrier component, according to a further aspect, the lavatory monument component that can engage with a second monument component can be an engagement feature of a lavatory monument door. In this aspect, the lavatory monument door itself can remain in position as a lavatory door within the lavatory monument footprint, while the second monument panel(s) can be configured from a stowed position to a deployed barrier configuration, with at least one of the deployed second monument panels configured to engage with a lavatory monument component to engage including engage in a locked configuration) for the purpose of forming the barrier that can be a secondary barrier.

That is, FIGS. 7A and 7B illustrate a present aspect with the second monument panel(s) deployed from a stowed configuration (e.g., stowed against a second monument wall, and substantially within a second monument footprint) and with the deployed second monument panel(s) comprising the preponderance of the physical barrier, and with the lavatory monument component not comprising a deployed door, but instead comprising a lavatory monument engagement point that can be located at and within a lavatory monument door and/or a lavatory monument wall section adjacent the lavatory monument door.

FIGS. 7A, 7B showing the establishment of barrier 70 is directed to a present aspect where a barrier is established within the vestibule 120 of an aircraft cabin in an aircraft 100 to control the movement forward and otherwise to prevent passengers from moving along an aisle in a vehicle cabin into a vehicle area (e.g., vestibule area) forward of the lockable barrier.

FIGS. 7A, 7B show establishing a barrier from existing aircraft cabin components with the barrier, that can be a secondary barrier formed via the deployment from a stowed position of a multi-section second monument bi-fold panel 74*b* deployed from a stowed position (within a second monument footprint and adjacent a second monument wall 74*c* of second monument 74) with the deployed second monument bi-fold panel 74*b* configured to engage with a lavatory monument component engagement point (that can be in the form of a lavatory monument door engagement point, a lavatory monument wall engagement point, a lavatory monument frame engagement point, etc.) to form barrier 70, that can be a secondary barrier.

According to a present aspect, FIGS. 7A, 7B show another example of the formation and configuration of a barrier (this time, barrier 70) with the establishment of barrier 70 created by the dual purpose lavatory monument component 73 (this time in the form of a lavatory monument engagement point 73*b*) engaging with the second monument bi-fold panel 74*b* to form barrier 70. As shown in FIGS. 7A, 7B, a barrier formation and configuration is presented, according to one aspect, where the second monument bi-fold panel 74*b* is engaged with lavatory monument component engagement point 73*b*, with the second monument bi-fold panel 74*b* configured to form in the deployed configuration, for example, an acute angle "θ".

As shown in FIG. 7A, an aircraft cabin lavatory monument 112*c* is located across aisle 106 from an aircraft cabin second monument 74 that is a galley monument 112*a*. FIG. 7A shows the aircraft cabin lavatory monument door 72 in a closed configuration.

When conditions onboard call for establishing a barrier that can be a secondary barrier, as shown in FIG. 7B, the second monument bi-fold panel 74*b* is moved from a stowed configuration adjacent second monument wall 74*c* to a deployed configuration extending away from second monument wall 74*c* and across aisle 106 and engaged with lavatory monument component engagement point 73*b* of lavatory monument component 73 to form barrier 70.

The second monument bi-fold panel 74*b* comprises second monument bi-fold panel first side 74*d* (the "inside" of the second monument bi-fold panel in a deployed position; also referred to as the forward side of the second monument bi-fold panel with respect to the aircraft when the second monument bi-fold panel is in the barrier configuration), and second monument bi-fold panel second side 74*e* (the "outside" of the second monument bi-fold panel also referred to as the aft side of the second monument bi-fold panel with respect to the aircraft when the second monument bi-fold panel is in the barrier configuration).

Lavatory monument 112*c* comprises lavatory monument door 72 that of the lavatory monument component 73. Lavatory monument component 73 further comprises lavatory wall 73*a* and lavatory component engagement point 73*b* of lavatory monument 112*c* that can be located at lavatory monument door 72, or at a location of the outer surface of the lavatory monument 112*c* proximate to lavatory monument door 72 (e.g., lavatory monument wall 73*a* located near lavatory monument door 72). Lavatory monument component engagement point 73*b* further comprises a mating component that is configured to releasably engage with a second monument engagement point 74*a* (of the second monument bi-fold panel 74*b*), for example, in a locked configuration.

FIG. 7B further shows second monument bi-fold panel 74*b* in movable communication with second monument wall 74*c* about a second monument wall hinge 75*a*, with the second monument bi-fold panel moved from a stowed position (shown in FIG. 7A) into the second monument bi-fold panel deployed configuration that is a position that is pivoted laterally away from the second monument wall 74c, with the second monument bi-fold panel configured to engage with lavatory monument component engagement point 73b, forming an engagement angle at the "fold" of the second monument bi-fold panel at an acute angle of less than about 90 degrees; "θ". In one example, the acute angle "θ" shown in FIG. 7B can range from about 30 degrees to about 80 degrees.

FIG. 7A shows flight crew 10 and passenger 12 as shown and described in present FIGs., with the additional recognition that in FIG. 7B, when on the forward side of completed barrier 70, flight crew personnel 10 can maneuver from flight deck 110 through flight deck door 110a and into lavatory monument 112c with greater ease, as barrier 70 can have a larger footprint (and more room "inside" or forward of the barrier) than barriers 20, 30 (shown in FIGS. 2B, 3B, for example), and passenger 12 is unable to proceed forward along aisle 106 past barrier 70.

That is, as shown in FIG. 7B, upon completion of the formation of barrier 70 that includes lavatory monument 112c (in the form of lavatory monument component 73) engaged with second monument bi-fold panel 74b at lavatory monument component engagement point 73b, the barrier 70 that is established that controls and restricts movement of unwanted persons/passengers from the passenger cabin to positions forward of the established barrier 70 (for example, along aisle 106). When desired (e.g., when barrier 70 is no longer desired, etc.), the second monument bi-fold panel 74b can disengage (e.g., unlock) from the lavatory monument component 73 at the lavatory monument component engagement point 73b, and return to a position within the footprint of second monument 74, and adjacent an outer wall of second monument 74.

FIG. 7C shows a view "aft" from within the barrier 70 established when the lavatory monument 72 is secured into an engaged position with second monument bi-fold panel 74b of the second monument 74 at the second monument engagement point 74a and engaged with the lavatory door engagement point 73b that can comprise a mating locking mechanism configured to mate and/or lock with the second monument engagement point 74a. Second monument bi-fold panel 74b further comprises a second monument bi-fold panel through opening 74f of similar type and function as through openings 22e, 32e as shown and described herein with respect to FIGS. 2C, 3C respectively. That is, through opening 74f can extend from the second monument bi-fold panel first side 74d (the door "inside") to the second monument bi-fold panel second side 74e (the second monument bi-fold panel "outside" not shown in FIG. 7C). Through opening 74f can be occupied with a transparent window. Further, through opening 74f permits and otherwise facilitates visual access/inspection of areas forward of deployed barrier 70 from positions aft of deployed barrier 70, and vice versa.

FIGS. 8, 9, 10 are block diagrams further illustrating present aspects. FIG. 8 shows block diagram 150 further illustrating present aspects where a vehicle 100 that can be in the form of an aircraft comprises an interior area 102 within a fuselage that contains an operation center 110 that can be, for example, a flight deck when the vehicle is in the form of an aircraft. The vehicle further comprises a main cabin area 103 that further comprises aircraft cabin monuments that, when configured into an assembly, form a barrier that can be a secondary barrier, with the barrier formed into aircraft cabin lockable barrier to prevent passengers from moving along an aisle in a vehicle cabin into a vehicle area forward of the lockable barrier. Within vestibule 120, lavatory monument 112c is located and positioned across an aircraft aisle from a second monument 24 that can be a galley monument that can also comprise a second monument engagement point 24a configured to mate with or otherwise securely engage with a lavatory monument component of the lavatory monument 112c to form a barrier across an aisle. The lavatory monument component can be at least one of a lavatory monument door 22 and a lavatory monument wall, and the lavatory monument further comprises a lavatory component engagement point 22d that can include a latch for engagement of the lavatory monument component to the second monument. The barrier that is established can further comprise a monitoring circuit 152 in communication with lavatory monument, further in communication with the second monument 24 that can be, for example, a galley monument and further in communication with a controller, with the circuit confirming the present position and the establishment of the barrier of the types disclosed herein. An indicator 154 is in communication with the monitoring circuit 152 to indicate the successful establishment of the barrier, with the at least one indicator 154 located in the flight deck 110 and/or at least one indicator positioned within vestibule 120 for viewing by an attendant as confirmation of the successful establishment/deployment of the barrier by an attendant.

FIG. 9 is a block diagram 150a that illustrates many of the components of block diagram 150 (in FIG. 8), and further includes second monument 34 that can be, for example, a galley monument comprising one or more second monument panels 34c that can be a bi-ford or multi-fold panel that is attached to, and that can be configured to extend away from a second monument wall to a deployed position that is configured to engage with a lavatory monument door in a deployed position to form a barrier of the type disclosed herein.

FIG. 10 is a block diagram 150b that illustrates many of the components of block diagrams 150 and 150a (in FIGS. 8, 9, respectively), and further includes second monument 74 that can be for example, a galley monument comprising one or more second monument panels 74b, that can be a bi-fold panel or a multi-fold panel that is attached to, and that can be configured to extend away from a second monument wall 74c to a deployed position that is configured to engage with a lavatory monument component 72 that can be a section of a lavatory monument door in a closed position and/or a lavatory monument wall to form a barrier of the type disclosed herein.

FIGS. 11, 12, and 13 are flowcharts outlining methods according to present aspects, with the methods outlined in FIGS. 11, 12, 13 employing the apparatuses and systems disclosed herein for establishing an aircraft cabin barrier that can be a secondary barrier of the types shown at least in FIGS. 2B, 3B, 4B, 5B, 6B, and 7B.

FIG. 11 is a flowchart illustrating a method 200 of controlling movement of passengers along an aisle within an aircraft cabin area, with the method including, prior to opening a flight deck door, moving 202 a barrier to a closed position with a flight deck being on a first side of the barrier and a passenger section of the cabin area being on a second side of the barrier. The barrier further includes an aircraft cabin lavatory monument, said aircraft cabin lavatory monument comprising an aircraft cabin lavatory component that can be, for example, a lavatory door or wall that is repurposed or comprises the dual purpose of also converting into an aircraft cabin barrier. The barrier further includes an aircraft cabin second monument, with the aircraft cabin second monument positioned a selected distance from and across an aircraft cabin aisle from the aircraft cabin lavatory monument, with the aircraft cabin second monument including a second monument component, with the aircraft cabin second monument component including at least one of an aircraft cabin second monument wall and a movable aircraft cabin second monument panel, with the second monument component configured to engage the aircraft cabin lavatory component, and wherein the aircraft cabin lavatory component in an engaged state with the aircraft cabin second monument component forms the barrier. The method further includes locking 204 the barrier in the closed position, and after locking the barrier, opening 206 the flight deck door and providing access to flight personnel to a front section of the cabin area, with the front section of the cabin area located at the first side of the barrier, and, after providing access to the front section of the cabin area to the flight personnel, reclosing 208 the flight deck door. Method 200 further optionally comprises moving 210 the barrier from a deployed and established barrier position to an open position, and returning the barrier components to their original barrier component positions as parts of existing aircraft cabin monuments.

In another aspect, FIG. 12 illustrate a method 300 including the features of method 200, and further including monitoring 302 a position of the barrier with the barrier components comprising elements of a monitoring circuit that can send a signal to, for example, a controller that can receive the signal indicating that the monument components have been assembled into a barrier configuration as a barrier that can further monitoring that the barrier has been locked. Method 300 further includes activating 304 an indicator that can receive a signal from a controller and/or from the monitoring circuit to provide a visually detected confirmation that the barrier has been successfully established and, if desired locked into the barrier position.

Methods 200, 300 can further include, after locking 204 the barrier door into the closed position to establish the barrier, permitting visual access through at least one of a lavatory monument door through opening and a second monument panel through opening, for example, by moving 209 an opaque panel from a closed position covering the through opening to an open position adjacent the at least one of the lavatory monument door through opening and the second monument panel through opening.

FIG. 13 is a flowchart outlining a method for flight crew to employ the presently disclosed barriers configured as secondary barriers, to prevent entry of unwanted persons from an aircraft cabin section toward spaces located forward of the established barrier including, for example, a flight deck. As shown in FIG. 13, method 400 comprises an initial scenario with flight crew needing to leave the flight deck 402, and flight crew calling 404 an attendant alerting attendant of needing to leave the flight deck. After checking to confirm that a lavatory is unoccupied 406, the flight attendant begins the process of deploying the lavatory from its primary use as a lavatory door 408, 410 to the dual purpose use of the lavatory door as a part of a barrier. Method 400 further comprises, depending upon the cabin configuration, continuing the deployment of the lavatory monument door and engaging 412 lavatory door with the second monument at a second monument engagement point that can be a surface of the second monument outer wall or that can be a second monument panel. Method 400 further comprises locking 414 the barrier in place by engaging a lock. Once the barrier is established, according to present aspects, method 400 further comprises notifying 416 flight crew that the barrier is established, followed by flight crew leaving 418 the flight deck. Upon returning 420 to the flight deck, method 400 comprises disengaging the barrier and returning 422 the lavatory door to the lavatory monument and, if present, returning second monument panels to a stowed configuration immediately adjacent to the second monument.

According to present aspects, the barrier that is established can act as a secondary barrier to inhibit a person that is in the passenger section of aircraft 100 from moving into the vestibule 120 and into the flight deck 110. In some examples, the barrier functions to slow the movement of the person into the vestibule 120. The barrier causes a time delay for unwanted passenger entry into areas forward of the deployed and established barrier as it requires the unwanted person to break the barrier or otherwise move the barrier to the open position. This time delay provides for flight personnel to move into the flight deck 110 and secure the flight deck door 110a. The flight deck door 110a is more secure than the barrier and may prevent the person from reaching the flight deck 110.

As stated herein, the aircraft 100 can be equipped with a barrier monitoring system 500 as illustrated in FIGS. 14 and 15. The monitoring system 500 receives signals from a sensor 512 at the flight deck door 110a and a sensor 510 at the barrier. The monitoring system 500 provides flight personnel in the flight deck 110 the status of the flight deck door 110a and the barrier. This prevents the flight deck door 110a from being opened when the barrier is in the open position. The sensor 510 senses the position of the barrier and sensor 512 senses the position of the flight deck door 110a. A control unit 501 receives signals from the sensors 510, 512 and monitors the positioning. An indicator 509 such as a light or audible alarm is positioned in the flight deck 110. Prior to opening the flight deck door 110a, the flight personnel checks the status of the barrier 20. If the barrier 20 is in the closed position, the flight deck door 110a can be opened. This provides for the flight personnel to access the vestibule 120 of the cabin area 103, such as to use the lavatory. If the barrier 20 is in the open position, the flight deck door 110a remains closed. This prevents a person that may be in the vestibule 120 from gaining access to the flight deck 110.

In some examples, control unit 501 controls the lock 540 on the flight deck door 110a. The control unit 501 maintains the lock 540 engaged when the barrier 20 is in the open position. The control unit 501 disengages the lock 540 and allows it to be opened when the barrier 20 is closed.

The control unit 501 monitors the status and operation of the flight deck door 110a. As illustrated in FIG. 15, the control unit 501 includes processing circuitry 502 and memory circuitry 503. The processing circuitry 502 controls overall operation of the monitoring according to program instructions stored in the memory circuitry 503. The processing circuitry 502 can include one or more circuits, microcontrollers, microprocessors, hardware, or a combination thereof. Memory circuitry 503 includes a non-transitory computer readable storage medium storing program instructions, such as a computer program product, that configures the processing circuitry 502 to implement one or more of the techniques discussed herein. Memory circuitry 503 can include various memory devices such as, for example, read-only memory, and flash memory.

The control unit 501 includes communication circuitry 508 that provides for communication functionality with the sensors 512, 510. The communication circuitry 508 can provide for one-way communications from the sensors 512, 510 or two-way communications that are both to and from the sensors 512, 510. The control unit 501 can also communicate with other systems on the aircraft 100, such as a flight control system that controls the operations of the aircraft during flight.

A user interface 504 provides for flight personnel to monitor the status. The user interface 504 can include one or more input devices 506 such as but not limited to a keypad, touchpad, roller ball, and joystick. The user interface 504 can also include one or more displays 505 for displaying information. Displays 505 can be positioned in one or more of the flight deck 110 and vestibule 120.

The indicator 509 provides for a visual and/or audible indication of the status of one or both of the flight deck door 110 and barrier 20. The indicator 509 can be a separate device, or can be incorporated within the user interface 504, such as a display icon on a display 505.

In one example, the lock 540 includes a metallic strip that extends along one of the outer sides (e.g., lateral side). The lock 540 also includes an electromagnetic locking device that engages with the metallic strip when the barrier 20 is in the closed position to secure the position. Flight personnel can unlock the lock 540 from the front side and allow for moving the barrier 20 to the open position. In the event of a power outage, the lock 540 is configured to disengage to provide for moving the barrier 20 to the open position. While barrier 20 is denoted in FIGS. 14, 15, the monitoring system 500 and control unit 501 shown in FIGS. 14, 15 can be used to monitor the status of the barrier position of any of barriers 20, 30, 40, 50, 60, 70 described herein While the lavatory monument door and the second monument panel (when present) are shown as a single panel or a bi-fold panel, present aspects contemplate any practical number of panels comprising multi-segment panels that can include three, for, five, six, etc., panels or more, with design considerations being weight of the additional segments employed in the multi-section panels and the robustness of the deployed multi-segment panels to provide a useful barrier, that can be a secondary barrier, to prevent passengers from moving along an aisle in a vehicle cabin into a vehicle area forward of the deployed barrier that can be a lockable and retractable barrier.

The term "substantially" as used herein means that a particular characteristic, parameter, or value does not need to be exactly achieved. Rather, deviations or variations, including, for example, tolerances, measurement error, measurement accuracy limitations, and other factors known to those skilled in the field, may occur in amounts that do not preclude the effect that the characteristic was intended to provide.

While a vehicle in the form of an aircraft is illustrated in the present FIGs., the present aspects can be incorporated to provide the improved barrier incorporating the deployable aircraft cabin lavatory monument component in a passenger vehicle including an aircraft, a rotorcraft, a marine vehicle, a terrestrial vehicle, a hovercraft, and combinations thereof.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. An aircraft cabin barrier comprising:
an aircraft cabin lavatory monument, said aircraft cabin lavatory monument comprising an aircraft cabin lavatory component, said aircraft cabin lavatory component comprising at least one of a movable aircraft lavatory door and an aircraft lavatory wall;
an aircraft cabin second monument, said aircraft cabin second monument positioned a selected distance from and across an aircraft cabin aisle from the aircraft cabin lavatory monument, said aircraft cabin second monument comprising a second monument component, said second monument component comprising an aircraft cabin second monument wall and said second monument component further comprising a movable aircraft cabin second monument multi-section panel, said second monument multi-section panel configured to engage the aircraft cabin lavatory component;
wherein the aircraft cabin lavatory component in an engaged state with the second monument multi-section panel forms the aircraft cabin barrier; and
wherein the movable aircraft lavatory door further comprises:
a movable aircraft lavatory door first side;
a movable aircraft cabin lavatory door second side;
a through opening region extending through a door thickness of the movable aircraft lavatory door, said door thickness extending from the movable aircraft lavatory door first side to the movable aircraft lavatory door second side;
a transparent window configured to occupy the through opening region;
a sliding panel frame in communication with the movable aircraft lavatory door first side, said sliding panel frame configured to house a sliding panel, said sliding panel configured to move between a sliding panel open position and a sliding panel closed position; and
wherein in the sliding panel open position the through opening region permits viewing access of location aft of the aircraft cabin barrier from within the aircraft cabin barrier.

2. The aircraft cabin barrier of claim 1, wherein the aircraft cabin barrier is configured to prevent movement of a person from a passenger cabin into a flight deck.

3. The aircraft cabin barrier of claim 1, wherein the aircraft cabin lavatory component is a movable aircraft cabin lavatory door movably attached to the aircraft cabin lavatory monument, said movable aircraft cabin lavatory door movable between a lavatory door first engaged position in contact with the aircraft cabin lavatory monument and a lavatory door second engaged position in contact with the second monument multi-section panel.

4. The aircraft cabin barrier of claim 1, wherein the aircraft cabin lavatory component is a movable aircraft cabin lavatory door and the second monument component is an aircraft cabin galley wall.

5. The aircraft cabin barrier of claim 1, wherein the aircraft cabin lavatory component is a movable aircraft cabin lavatory door and the second monument component is an aircraft cabin galley multi-section panel.

6. The aircraft cabin barrier of claim 1, wherein the aircraft cabin lavatory component is an aircraft cabin lavatory wall and the second monument component is a movable aircraft cabin galley bi-fold panel.

7. The aircraft cabin barrier of claim 1, wherein the second monument multi-section panel releasably engages the aircraft cabin lavatory component in a locked configuration.

8. The aircraft cabin barrier of claim 1, wherein the movable aircraft lavatory door further comprises a plurality of folding door panels.

9. The aircraft cabin barrier of claim 1, further comprising a barrier locking mechanism that is only accessible from the movable aircraft lavatory door first side.

10. The aircraft cabin barrier of claim 1, wherein the movable aircraft cabin second monument multi-section panel further comprises:

a movable aircraft cabin second monument multi-section panel first side;

a movable aircraft cabin second monument multi-section panel second side;

a through opening region extending through a panel thickness of the movable aircraft cabin second monument multi-section panel, said panel thickness extending from the movable aircraft cabin second monument multi-section panel first side to the movable aircraft cabin second monument multi-section panel second side;

a transparent window configured to occupy the through opening region;

a sliding panel frame in communication with the movable aircraft cabin second monument multi-section panel first side, said sliding panel frame configured to house a sliding panel, said sliding panel configured to move between a sliding panel open position and a sliding panel closed position; and wherein in the sliding panel open position the through opening region permits viewing access of location aft of the aircraft cabin barrier from within the aircraft cabin barrier.

11. An aircraft comprising the aircraft cabin barrier of claim 10.

12. The aircraft cabin barrier of claim 1, wherein the second monument component comprises a plurality of movable aircraft cabin second monument panels.

13. The aircraft cabin barrier of claim 10, further comprising a barrier locking mechanism that is only accessible from the movable aircraft cabin second monument panel first side.

14. An aircraft comprising the aircraft cabin barrier of claim 1.

15. An aircraft cabin lavatory monument comprising:

a dual purpose aircraft cabin lavatory door movably attached to an aircraft cabin lavatory frame, said dual purpose aircraft cabin lavatory door comprising:

a movable aircraft lavatory door first side;

a movable aircraft lavatory door second side;

a through opening region extending through a door thickness of the dual purpose aircraft lavatory door, said door thickness extending from the movable aircraft lavatory door first side to the movable aircraft lavatory door second side;

a transparent window configured to occupy the through opening region;

a sliding panel frame in communication with the movable aircraft lavatory door first side, said sliding panel frame configured to house a sliding panel, said sliding panel configured to move between a sliding panel open position and a sliding panel closed position;

wherein in the sliding panel open position the through opening region permits viewing access of location aft of an aircraft cabin barrier from within the aircraft cabin barrier;

wherein in a closed position in a first lavatory door mode, said dual purpose aircraft cabin lavatory door is configured to completely enclose an aircraft cabin lavatory monument footprint;

wherein in a closed position in a second lavatory door mode, said dual purpose aircraft cabin lavatory door is configured to engage an aircraft cabin second monument multi-section panel to form an aircraft cabin secondary barrier; and wherein said aircraft cabin secondary barrier is configured to control movement of passengers along an aisle within an aircraft cabin area.

16. A method of controlling movement of passengers along an aisle within an aircraft cabin area, the method comprising:

prior to opening a flight deck door, establishing an aircraft cabin secondary barrier into an aircraft cabin secondary barrier deployed position with a flight deck being on a first side of the aircraft cabin secondary barrier, and with a passenger section of a cabin area being on a second side of the aircraft cabin secondary barrier, the aircraft cabin secondary barrier comprising;

an aircraft cabin lavatory monument, said aircraft cabin lavatory monument comprising an aircraft cabin lavatory component, said aircraft cabin lavatory component comprising at least one of a movable aircraft lavatory door and an aircraft lavatory wall;

an aircraft cabin second monument, said aircraft cabin second monument positioned a selected distance from and across an aircraft cabin aisle from the aircraft cabin lavatory monument, said aircraft cabin second monument comprising a second monument component, said second monument component comprising an aircraft cabin second monument wall, said second monument component further comprising a movable aircraft cabin second monument multi-section panel hingedly attached to the aircraft cabin second monument wall, said second monument multi-section panel configured to releasably engage the aircraft cabin lavatory component;

locking the aircraft cabin secondary barrier in a closed position;

after locking the aircraft cabin secondary barrier, opening the flight deck door and providing access to flight personnel to a front section of the cabin area, said front section of the cabin area located at the first side of the aircraft cabin secondary barrier; and after providing access to the front section of the cabin area to the flight personnel, reclosing the flight deck door.

17. The method of claim 16, further comprising:

monitoring a position of the aircraft cabin secondary barrier; and activating an indicator in the flight deck when the aircraft cabin secondary barrier is in the closed position.

18. The method of claim 16, wherein the movable aircraft lavatory door further comprises:

a movable aircraft lavatory door first side;

a movable aircraft lavatory door second side;

a movable aircraft lavatory door through opening region extending through a door thickness of the movable aircraft lavatory door, said door thickness extending from the movable aircraft lavatory door first side to the movable aircraft lavatory door second side;

a transparent window configured to occupy the through opening region;

a sliding panel frame in communication with the movable aircraft lavatory door first side, said sliding panel frame configured to house a sliding panel, said sliding panel configured to move between a sliding panel open position and a sliding panel closed position; and wherein in the sliding panel open position the through opening region permits viewing access of location aft of an aircraft cabin barrier from within the aircraft cabin barrier.

19. The method of claim 18, further comprising:

after locking the aircraft cabin secondary barrier, moving the sliding panel to the sliding panel open position to permit visual access through the movable aircraft lavatory door through opening region.

20. The method of claim 16, wherein the movable aircraft cabin second monument multi-section panel further comprises:

a movable aircraft cabin second monument multi-section panel first side;

a movable aircraft cabin second monument multi-section panel second side;

a movable aircraft cabin second monument multi-section panel through opening region extending through a panel thickness of the movable aircraft cabin second monument multi-section panel, said panel thickness extending from the movable aircraft cabin second monument multi-section panel first side to the movable aircraft cabin second monument multi-section panel second side; and a transparent window configured to occupy the second monument multi-section panel through opening region, said transparent window further configured to selectively permit visual access through the movable aircraft cabin second monument multi-section panel through opening region.

* * * * *